(12) United States Patent
Yuan

(10) Patent No.: US 11,082,601 B2
(45) Date of Patent: Aug. 3, 2021

(54) IMAGING DEVICE AND LENS FOCUSING METHOD

(71) Applicant: HANGZHOU HIKMICRO SENSING TECHNOLOGY CO., LTD., Hangzhou (CN)

(72) Inventor: Weijun Yuan, Hangzhou (CN)

(73) Assignee: HANGZHOU HIKMICRO SENSING TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/648,574

(22) PCT Filed: Jun. 14, 2018

(86) PCT No.: PCT/CN2018/091256
§ 371 (c)(1),
(2) Date: Mar. 18, 2020

(87) PCT Pub. No.: WO2019/062211
PCT Pub. Date: Apr. 4, 2019

(65) Prior Publication Data
US 2020/0275013 A1 Aug. 27, 2020

(30) Foreign Application Priority Data

Sep. 30, 2017 (CN) .......................... 201710940346.3
Sep. 30, 2017 (CN) .......................... 201721282426.6

(51) Int. Cl.
*H04N 5/232* (2006.01)
*G02B 7/04* (2021.01)
(Continued)

(52) U.S. Cl.
CPC ........... *H04N 5/23212* (2013.01); *G02B 7/04* (2013.01); *G03B 13/34* (2013.01); *H04N 5/2253* (2013.01);
(Continued)

(58) Field of Classification Search
CPC ............. H04N 5/23212; H04N 5/2253; H04N 5/2254; H04N 5/2258; G02B 7/04;
(Continued)

(56) References Cited

U.S. PATENT DOCUMENTS 5,654,757 A    8/1997   Murakami et al.
6,937,285 B2   8/2005   Ohkawara
(Continued)

FOREIGN PATENT DOCUMENTS

CN        1176395       3/1998
CN      102538609       7/2012
(Continued)

OTHER PUBLICATIONS

International Search Report and Written Opinion issued in corresponding PCT application No. PCT/CN2018/091256, dated Aug. 31, 2018 (English Translation of International Search Report provided).

(Continued)

*Primary Examiner* — Albert H Cutler
(74) *Attorney, Agent, or Firm* — Norton Rose Fulbright US LLP

(57) ABSTRACT

An imaging device and a lens focusing method are provided. The device includes a focusing wheel, two photoelectric sensors, at least three gratings, a processor, a motor, and a lens, the gratings are distributed on an inner sidewall of the focusing wheel, grating gaps having a same width exist between adjacent gratings. The processor determines a first electrical signal generated by a first photoelectric sensor and a second electrical signal generated by a second photoelectric sensor; determines a current rotation direction of the focusing wheel based on the first electrical signal and the second electrical signal as well as a preset parameter table; and determines a current rotation angle of the focusing wheel based on the number of level jumps of the first electrical signal or the second electrical signal.

13 Claims, 9 Drawing Sheets

(51) Int. Cl.
*G03B 13/34* (2021.01)
*H04N 5/225* (2006.01)
*G02B 7/10* (2021.01)
*G03B 3/10* (2021.01)

(52) U.S. Cl.
CPC ......... *H04N 5/2254* (2013.01); *H04N 5/2258* (2013.01)

(58) Field of Classification Search
CPC . G02B 7/28; G02B 7/10; G02B 7/103; G03B 13/34; G03B 3/10
See application file for complete search history.

(56) References Cited

U.S. PATENT DOCUMENTS

| | | |
|---|---|---|
| 9,235,026 B2 | 1/2016 | Taguchi et al. |
| 2002/0041334 A1 | 4/2002 | Okawara |
| 2012/0141103 A1 | 6/2012 | Chiang |
| 2012/0327274 A1* | 12/2012 | Taguchi ............... H04N 5/2254 348/240.2 |
| 2013/0163975 A1 | 6/2013 | Toyama et al. |
| 2014/0043526 A1 | 2/2014 | Noguchi |
| 2017/0199347 A1* | 7/2017 | Takeshita ................. G03B 3/10 |
| 2017/0235090 A1* | 8/2017 | Takeshita ................. G02B 7/02 348/345 |

FOREIGN PATENT DOCUMENTS

| | | |
|---|---|---|
| CN | 202533643 | 11/2012 |
| CN | 207249317 | 4/2018 |

OTHER PUBLICATIONS

Extended European Search Report issued in corresponding European application No. 18863571.8, dated Oct. 23, 2020.

* cited by examiner

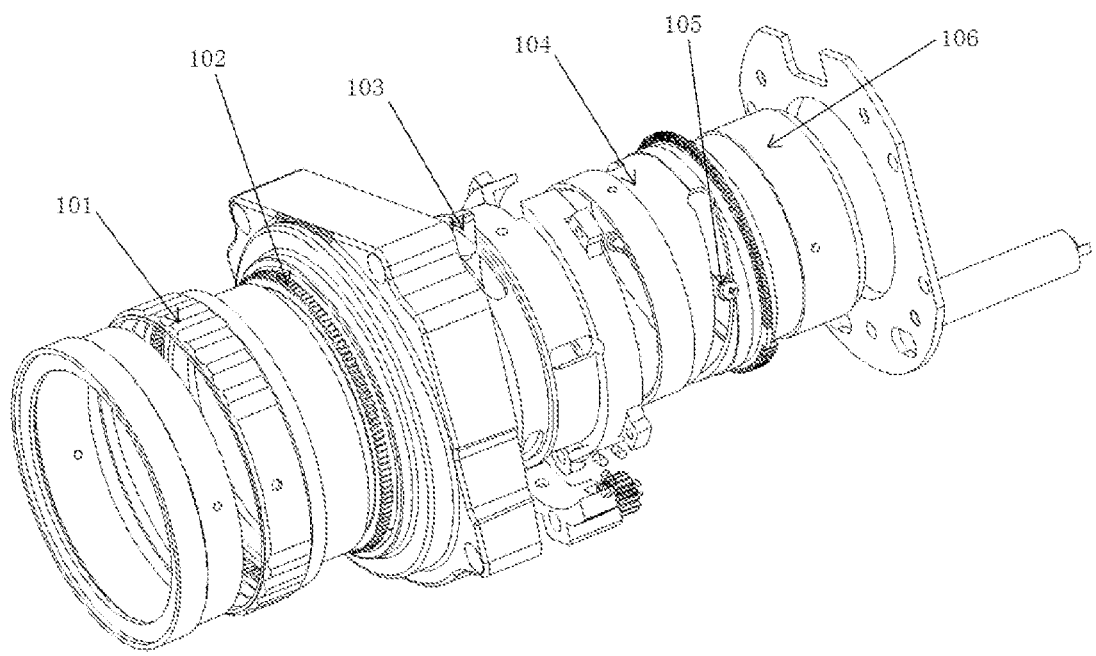

Fig. 1 (prior art)

```
┌─────────────────────────────────────────────────────────────┐ 201
│ determining a first electrical signal generated by a first   │
│ photoelectric sensor; and determining a second electrical    │
│ signal generated by a second photoelectric sensor            │
└─────────────────────────────────────────────────────────────┘
                              │
                              ▼
┌─────────────────────────────────────────────────────────────┐ 202
│ determining a current rotation direction of the focusing     │
│ wheel based on the first electrical signal and the second    │
│ electrical signal as well as a preset parameter table        │
└─────────────────────────────────────────────────────────────┘
                              │
                              ▼
┌─────────────────────────────────────────────────────────────┐ 203
│ determining a current rotation angle of the focusing wheel   │
│ based on the number of level jumps of the first electrical   │
│ signal or the second electrical signal                       │
└─────────────────────────────────────────────────────────────┘
```

Fig. 2

IMAGING DEVICE AND LENS FOCUSING METHOD

CROSS REFERENCE TO RELATED APPLICATIONS

The present application is a national phase application under 35 U.S.C. § 371 of International Application No. PCT/CN2018/091256, filed Jun. 14, 2018, which claims the priority to a Chinese patent application No. 201710940346.3 filed with the China National Intellectual Property Administration on Sep. 30, 2017 and entitled "Imaging Device and Lens Focusing Method", and a Chinese patent application No. 201721282426.6 filed with the China National Intellectual Property Administration on Sep. 30, 2017 and entitled "Imaging Device", each of which are incorporated herein by reference in their entirety.

TECHNICAL FIELD

The present application relates to the field of information processing technology, and in particular to an imaging device and a lens focusing method.

BACKGROUND

In practical applications, lens focusing methods for an imaging device include automatic focusing and manual focusing.

At present, a widely used focusing method is the manual focusing method. The manual focusing method uses the connection of mechanical gears to achieve lens focusing. Specifically, referring to FIG. 1, FIG. 1 is a schematic structural diagram of a focusing apparatus for an imaging device using the connection of mechanical gears to realize lens focusing in the related art. A mechanical focusing wheel 101 is engaged with the gear of an adapter ring 102, and the adapter ring 102 is fixedly connected to a cam 104 through a pin 103. One end of a positioning pin 105 is located in a guide groove on the cam 104, and the other end of the positioning pin 105 is fixedly connected to a focusing lens barrel 106.

During the lens focusing process using the above-mentioned focusing apparatus, when the mechanical focusing wheel 101 is rotated, the cam 104 is driven to rotate in a circumferential direction by the engagement of the mechanical focusing wheel 101 and the gear of the adapter ring 102 as well as the pin 103 fixed on the cam 104, and then the focusing lens barrel 106 is driven through the positioning pin 105 to move back and forth in an axial direction, thus achieving manual focusing.

Although lens focusing can be achieved by applying the above apparatus, the focusing apparatus includes a large number of parts, which require a high processing accuracy and complicated transmission between gears. This not only makes the focusing apparatus costly and difficult to process, but also fails to meet the needs of mass-production of the focusing apparatus.

SUMMARY

The objective of the embodiments of the present application is to provide an imaging device and a lens focusing method, to achieve manual focusing of the lens by means of photoelectric sensors and gratings. The specific technical solution is as follows.

To achieve the above objective, an embodiment of the present application provides an imaging device, which includes a focusing wheel, two photoelectric sensors, at least three gratings, a processor, a motor, and a lens, wherein gratings of the at least three gratings are distributed on an inner sidewall of the focusing wheel, grating gaps having a same width exist between adjacent gratings; when the focusing wheel rotates, a grating of the at least three gratings passes the two photoelectric sensors;

the processor is configured to determine a first electrical signal generated by a first photoelectric sensor of the two photoelectric sensors, wherein a level of the first electrical signal changes when a grating of the at least three gratings passes the first photoelectric sensor;

the processor is configured to determine a second electrical signal generated by a second photoelectric sensor of the two photoelectric sensors, wherein a level of the second electrical signal changes when a grating of the at least three gratings passes the second photoelectric sensor;

the processor is configured to determine a current rotation direction of the focusing wheel based on the first electrical signal and the second electrical signal as well as a preset parameter table, wherein the parameter table contains a correspondence among the first electrical signal, the second electrical signal, and a rotation direction of the focusing wheel;

the processor is configured to determine a current rotation angle of the focusing wheel based on the number of level jumps of the first electrical signal or the number of level jumps of the second electrical signal, wherein the level jump is a jump from high level to low level or a jump from low level to high level;

the processor is configured to drive the motor to focus the lens according to the current rotation direction and the current rotation angle of the focusing wheel.

Optionally, the processor is specifically configured to:

determine a current focusing direction of the lens based on a first parameter configuration and the current rotation direction of the focusing wheel, wherein the first parameter configuration contains a correspondence between a rotation direction of the focusing wheel and a focusing direction of the lens, the focusing direction of the lens includes axial zoom in and axial zoom out;

determine a current focusing distance of the lens based on a second parameter configuration and the current rotation angle of the focusing wheel, wherein the second parameter configuration contains a correspondence between the rotation direction of the focusing wheel and the focusing direction of the lens;

drive the motor to focus the lens based on the current focusing direction and the current focusing distance of the lens.

Optionally, the current rotation angle of the focusing wheel is equal to the number of level jumps multiplied by one grating period angle, wherein the grating period angle is an angle of one grating period on the inner sidewall of the focusing wheel, and one grating period consists of one grating and one adjacent grating gap.

Optionally, the imaging device further includes a fixing member, on which the two photoelectric sensors are mounted;

a grating ratio is a preset value, and a current phase difference between positions of the two photoelectric sensors on the fixing member with respect to the grating period conforms to a preset phase difference;

wherein, the grating ratio is a ratio of a width of one grating to a width of one grating period, and one grating period consists of one grating and one adjacent grating gap; the current phase difference is calculated based on the grating period angle and a sensor angle, the grating period angle is an angle of one grating period on the inner sidewall of the focusing wheel, and the sensor angle is an angle between the two photoelectric sensors on the inner sidewall of the focusing wheel.

Optionally, if the grating ratio d is d=0.5, the preset phase difference ω is: 0<ω<360° and ω≠180°;

if the grating ratio d is 0<d<0.5, the preset phase difference ω is: 0<ω<d*360° or (1−d)*360°<ω<360°;

if the grating ratio d is 0.5<d<1, the preset phase difference ω is: 0<ω<(1−d)*360° or d*360°<ω<360°.

Optionally, the parameter table contains a correspondence among five consecutive level signals of the first electrical signal, five consecutive level signals of the second electrical signal corresponding to the first electrical signal, and the rotation direction of the focusing wheel.

Optionally, the parameter table contains:

a correspondence among a first level status sequence of low-level, high-level, high-level, low-level and low-level of the first electrical signal, a second level status sequence of low-level, low-level, high-level, high-level and low-level of the second electrical signal, and a clockwise rotation direction;

a correspondence among a third level status sequence of low-level, low-level, high-level, high-level and low-level of the first electrical signal, a fourth level status sequence of low-level, high-level, high-level, low-level and low-level of the second electrical signal, and a counterclockwise rotation direction;

wherein a phase of the first photoelectric sensor with respect to the grating period is smaller than a phase of the second photoelectric sensor with respect to the grating period.

Optionally, the processor is specifically configured to:

if a first position and a second position are the same, determine that the current rotation direction of the focusing wheel is clockwise; wherein, the first position is a position of two adjacent level statuses of the first electrical signal in the first level status sequence, the second position is a position of two adjacent level statuses of the second electrical signal in the second level status sequence;

if a third position and a fourth position are the same, determine that the current rotation direction of the focusing wheel is counterclockwise; the third position is a position of two adjacent level statuses of the first electrical signal in the third level status sequence, the fourth position is a position of two adjacent level statuses of the second electrical signal in the fourth level status sequence.

To achieve the above objective, an embodiment of the present application provides a lens focusing method, which is applied to an imaging device, wherein the imaging device includes a focusing wheel, two photoelectric sensors, at least three gratings, a processor, a motor, and a lens, wherein gratings of the at least three gratings are distributed on an inner sidewall of the focusing wheel, grating gaps having a same width exist between adjacent gratings, when the focusing wheel rotates, a grating of the at least three gratings passes the two photoelectric sensors; the method includes:

the processor determining a first electrical signal generated by a first photoelectric sensor of the two photoelectric sensors, wherein a level of the first electrical signal changes when a grating of the at least three gratings passes the first photoelectric sensor;

determining a second electrical signal generated by a second photoelectric sensor of the two photoelectric sensors, wherein a level of the second electrical signal changes when a grating of the at least three gratings passes the second photoelectric sensor;

determining a current rotation direction of the focusing wheel based on the first electrical signal and the second electrical signal as well as a preset parameter table, wherein the parameter table contains a correspondence among the first electrical signal, the second electrical signal, and a rotation direction of the focusing wheel;

determining a current rotation angle of the focusing wheel based on the number of level jumps of the first electrical signal or the number of level jumps of the second electrical signal, wherein the level jump is a jump from high level to low level or a jump from low level to high level;

driving the motor to focus the lens according to the current rotation direction and the current rotation angle of the focusing wheel.

Optionally, the step of driving the motor to focus the lens according to the current rotation direction and the current rotation angle of the focusing wheel includes:

determining a current focusing direction of the lens based on a first parameter configuration and the current rotation direction of the focusing wheel, wherein the first parameter configuration contains a correspondence between a rotation direction of the focusing wheel and a focusing direction of the lens, the focusing direction of the lens includes axial zoom in and axial zoom out;

determining a current focusing distance of the lens based on a second parameter configuration and the current rotation angle of the focusing wheel, wherein the second parameter configuration contains a correspondence between the rotation direction of the focusing wheel and the focusing direction of the lens;

driving the motor to focus the lens based on the focusing direction and the focusing distance of the lens.

Optionally, the current rotation angle of the focusing wheel is equal to the number of level jumps multiplied by one grating period angle, wherein the grating period angle is an angle of one grating period on the inner sidewall of the focusing wheel, and one grating period consists of one grating and one adjacent grating gap.

Optionally, the imaging device further includes a fixing member, on which the two photoelectric sensors are mounted;

a grating ratio is a preset value, and a current phase difference between the two photoelectric sensors with respect to the grating period conforms to a preset phase difference;

wherein, the grating ratio is a ratio of a width of one grating to a width of one grating period, and one grating period consists of one grating and one adjacent grating gap; the current phase difference is calculated based on the grating period angle and a sensor angle, the grating period angle is an angle of one grating period on the inner sidewall of the focusing wheel, and the sensor angle is an angle between the two photoelectric sensors on the inner sidewall of the focusing wheel.

Optionally, if the grating ratio d is d=0.5, the preset phase difference ω is: 0<ω<360° and ω≠180°;

if the grating ratio d is 0<d<0.5, the preset phase difference ω is: 0<ω<d*360° or (1−d)*360°<ω<360°;

if the grating ratio d is 0.5<d<1, the preset phase difference ω is: 0<ω<(1−d)*360° or d*360°<ω<360°.

Optionally, the parameter table contains a correspondence among five consecutive level signals of the first electrical signal, five consecutive level signals of the second electrical signal corresponding to the first electrical signal, and the rotation direction of the focusing wheel.

Optionally, the parameter table contains:

a correspondence among a first level status sequence of low-level, high-level, high-level, low-level and low-level of the first electrical signal, a second level status sequence of low-level, low-level, high-level, high-level and low-level of the second electrical signal, and a clockwise rotation direction;

a correspondence among a third level status sequence of low-level, low-level, high-level, high-level and low-level of the first electrical signal, a fourth level status sequence of low-level, high-level, high-level, low-level and low-level of the second electrical signal, and a counterclockwise rotation direction;

wherein a phase of the first photoelectric sensor with respect to the grating period is smaller than a phase of the second photoelectric sensor with respect to the grating period.

Optionally, the step of determining a current rotation direction of the focusing wheel based on the first electrical signal and the second electrical signal as well as a preset parameter table includes:

if a first position and a second position are the same, determine that the current rotation direction of the focusing wheel is clockwise; wherein, the first position is a position of two adjacent level statuses of the first electrical signal in the first level status sequence, the second position is a position of two adjacent level statuses of the second electrical signal in the second level status sequence;

if a third position and a fourth position are the same, determine that the current rotation direction of the focusing wheel is counterclockwise; the third position is a position of two adjacent level statuses of the first electrical signal in the third level status sequence, the fourth position is a position of two adjacent level statuses of the second electrical signal in the fourth level status sequence.

To achieve the above objective, an embodiment of the present application provides an imaging device, which includes a focusing wheel, two photoelectric sensors, a fixing member, a processor, a motor, a main lens barrel, a focusing lens barrel, and a first lens;

the focusing lens barrel is disposed within the main lens barrel to be axially movable;

the first lens is disposed fixedly within the main lens barrel;

at least two gratings are disposed on an inner sidewall of the focusing wheel, and grating gaps between two adjacent gratings are equal; a grating of the at least two gratings passes the two photoelectric sensors when the focusing wheel rotates;

the fixing member is fixed on an outer sidewall of the main lens barrel close to the motor; the two photoelectric sensors are mounted on the fixing member, the focusing wheel is rotatably mounted on an outer sidewall of the main lens barrel away from the motor, a first gap exists between the focusing wheel and the fixing member along an axial direction of the main lens barrel;

the motor is mounted on an outer sidewall of the main lens barrel;

the photoelectric sensor is configured to generate an electrical signal and send the generated electrical signal to the processor; wherein, the electrical signal generated by the photoelectric sensor changes when a grating passes the photoelectric sensor; the processor is electrically connected to the motor, and the processor is configured to drive the motor to move the focusing lens barrel according to the electrical signals sent by the photoelectric sensors.

Optionally, the imaging device further includes a second lens;

the second lens is disposed fixedly within the focusing lens barrel.

Optionally, the imaging device further includes a pin;

the motor is connected to the focusing lens barrel via the pin;

the motor is used to drive the focusing lens barrel by means of the pin to move axially so as to adjust a relative position between the second lens and the first lens.

Optionally, positions of the two photoelectric sensors on the fixing member form a preset angle.

Optionally, a distance between the positions of the two photoelectric sensors on the fixing member is greater than or equal to one grating period, and one grating period consists of one grating and one adjacent grating gap.

Optionally, the fixing member is sleeved fixedly on the outer sidewall of the main lens barrel close to the motor;

the focusing wheel is sleeved rotatablely on the outer sidewall of the main lens barrel away from the motor;

a second gap exists between the focusing wheel and the outer sidewall of the main lens barrel.

Optionally, the imaging device further includes a focusing pressure ring;

the focusing pressure ring is connected to the fixing member;

the focusing pressure ring is sleeved on the outer sidewall of the main lens barrel;

the focusing wheel is sleeved on the outer sidewall of the focusing pressure ring.

Optionally, the imaging device further includes a PCB board, which is fixedly mounted on the fixing member and on which the two photoelectric sensors are mounted.

Optionally, the gratings are distributed over an entire circumference of the inner sidewall of the focusing wheel; or, the gratings are distributed over a part of a circumference of the inner sidewall of the focusing wheel.

It can be seen that an imaging device and a lens focusing method provided in the embodiments of the present application can determine the current rotation direction and the current rotation angle of a focusing wheel by means of photoelectric sensors, so that the focusing direction and the focusing distance of the lens can be determined based on the determined current rotation direction and the current rotation angle of the focusing wheel to achieve accurate focusing of the lens. The focusing device using photoelectric sensors has a simple structure with a small number of parts and reduced processing difficulty, which not only reduces the cost of the device, but also meets the needs of mass production. Of course, the implementation of any product or method of this application does not necessarily need to achieve all the advantages described above at the same time.

BRIEF DESCRIPTION OF THE DRAWINGS

In order to describe the technical solutions in the embodiments of the present application or the prior art more clearly, the drawings used in the description of the embodiments or the prior art will be briefly introduced below. It is apparent that the drawings in the following description are only some embodiments of the present application. For those of ordinary skill in the art, other drawings can be obtained based on these drawings without any creative effort.

FIG. 1 is a schematic structural diagram of a focusing apparatus in an imaging device using a mechanical gear connection for lens focusing in the related art;

FIG. 2 is a flowchart of a method for determining a lens focusing parameter provided by an embodiment of the present application;

DETAILED DESCRIPTION OF THE INVENTION

The technical solutions in the embodiments of the present application will be clearly and completely described below with reference to the drawings in the embodiments of the present application. It is apparent that the described embodiments are only a part of the embodiments of the present application rather than all of them. All other embodiments obtained by those of ordinary skill in the art based on the embodiments of the present application without any creative effort fall within the protection scope of the present application.

An embodiment of the present application provides a lens focusing method, which is applied to an imaging device. The imaging device includes a focusing wheel, two photoelectric sensors, at least three gratings, a processor, a motor, and a lens, wherein gratings of the at least three gratings are distributed on the inner sidewall of the focusing wheel, grating gaps having a same width exist between adjacent gratings. When the focusing wheel rotates, a grating passes two photoelectric sensors.

The gratings provided on the inner sidewall of the focusing wheel 1 are tooth-shaped protrusions, which may be a cuboid, or a cube, or of course other shapes. A grating can be used as a tooth on the focusing wheel, and the grating gap is the tooth gap.

The two photoelectric sensors are a first photoelectric sensor and a second photoelectric sensor, respectively.

Referring to FIG. 2, FIG. 2 is a flowchart of a method for determining a lens focusing parameter provided by an embodiment of the present application, including the following steps:

Step 201: determining a first electrical signal generated by a first photoelectric sensor; and determining a second electrical signal generated by a second photoelectric sensor.

The first photoelectric sensor generates a first electrical signal, and the level of the first electrical signal changes when a grating of the at least three gratings passes the first photoelectric sensor. The second photoelectric sensor generates a second electrical signal and the level of the second electrical signal changes when a grating of the at least three gratings passes the second photoelectric sensor. Here, the positions of the first photoelectric sensor and the second photoelectric sensor are not limited, as long as the grating passes the two photoelectric sensors when the focusing wheel rotates.

In this step, the processor of the imaging device determines the electrical signals generated by the two photoelectric sensors. In other words, in step 201, the processor determines the first electrical signal generated by the first photoelectric sensor of the two photoelectric sensors, and determines the second electrical signal generated by the second photoelectric sensor of the two photoelectric sensors.

Figure 3:
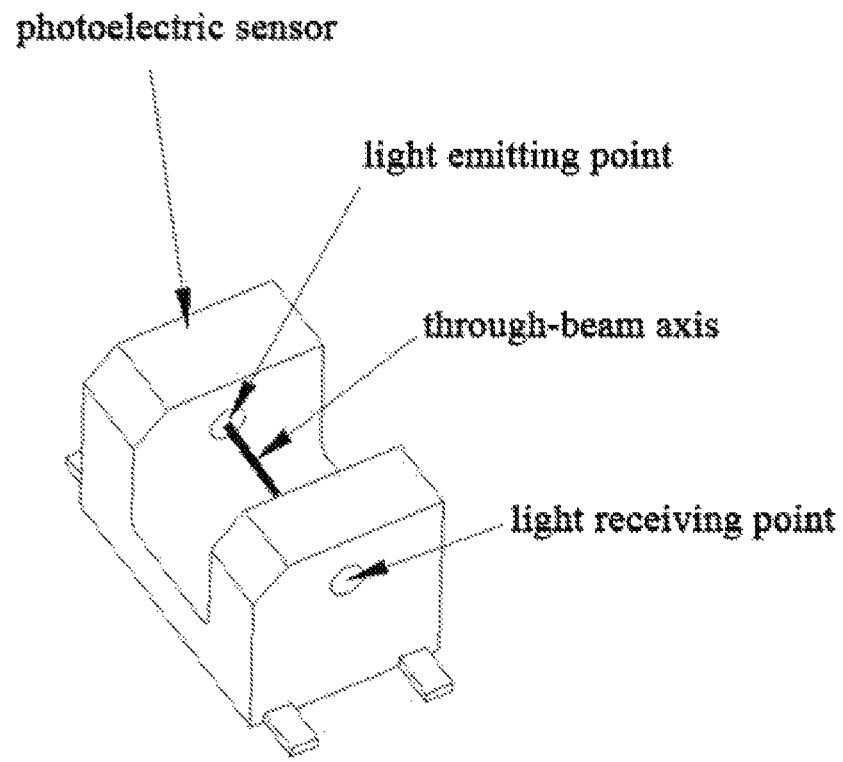
FIG. 3 is a structural diagram of a photoelectric sensor provided by an embodiment of the present application.

The electrical signal mentioned herein will only change when the photoelectric sensor detects that the grating on the focusing wheel blocks the through-beam axis of its own device. As shown in FIG. 3, FIG. 3 is a structural diagram of a photoelectric sensor provided by an embodiment of the present application, in which a through-beam axis exists between a light emitting point and a light receiving point on a photoelectric sensor.

When the photoelectric sensor detects that the grating on the focusing wheel blocks the through-beam axis of its own device, the electrical signal generated by the photoelectric sensor changes, for example, the electrical signal generated by the photoelectric sensor changes from low level to high level, or from high level to low level.

In an implementation, at least two identical gratings are arranged on the focusing wheel, and grating gaps having a same width exist between adjacent gratings.

In this way, when a grating passes the photoelectric sensor, the durations during which the through-beam axes of the photoelectric sensors are blocked are the same and the duration during which the through-beam axes of the photoelectric sensors are not blocked are the same. The durations during which the photoelectric sensors generate high-level electrical signals are the same and the durations during which the photoelectric sensors generate low-level electrical signals are the same.

Figure 4:
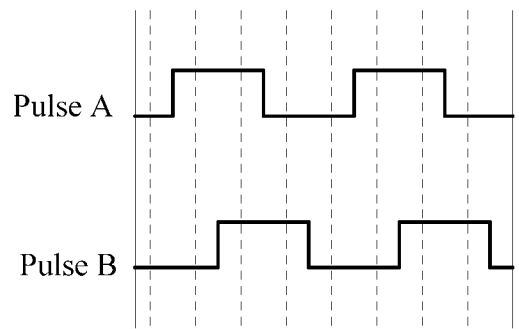
FIG. 4 is a first schematic diagram of electrical signals generated by two photoelectric sensors in an embodiment of the present application.

For example, as shown in FIG. 4, FIG. 4 is a first schematic diagram of electrical signals generated by two photoelectric sensors in an embodiment of the present application. In FIG. 4, when the focusing wheel rotates, the grating passes two photoelectric sensors, the first electrical signal generated by the first photoelectric sensor is pulse A, and the second electrical signal generated by the second photoelectric sensor is pulse B. The temporal sequence of the level status of pulse A is low level, high level, high level, low level, low level, high level, high level, low level, and low level. If 0 represents low level and 1 represents high level, then the level status of pulse A can be expressed as: 0, 1, 1, 0, 0, 1, 1, 0, 0. Correspondingly, the temporal sequence of the level status of pulse B is low level, low level, high level, high level, low level, low level, high level, high level, low level. If 0 represents low level and 1 represents high level, then the level status of pulse B can be expressed as: 0, 0, 1, 1, 0, 0, 1, 1, 0.

In FIG. 4, the temporal changes in the level status of pulse A and the level status of pulse B can be referred to Table 1.

TABLE 1

| pulse | signals generated by photoelectric sensors | | | | |
| --- | --- | --- | --- | --- | --- |
| pulse A | 0 | 1 | 1 | 0 | 0 |
| pulse B | 0 | 0 | 1 | 1 | 0 |

In Table 1, 0 represents low level, and 1 represents high level.

Step 202: determining a current rotation direction of the focusing wheel based on the first electrical signal and the second electrical signal as well as a preset parameter table.

The parameter table contains a correspondence among the first electrical signal, the second electrical signal, and the rotation direction of the focusing wheel.

In this step, the processor of the imaging device determines the current rotation direction of the focusing wheel based on the determined electrical signals generated by the two photoelectric sensors respectively and the preset parameter table to further determine the focusing direction of a lens.

In the imaging device, when the rotation direction of the focusing wheel is different, the correspondence between the two optical signals generated by the two photoelectric sensors is different. Based on the correspondence among the first electrical signal, the second electrical signal and the rotation direction of the focusing wheel, the current rotation direction of the focusing wheel is determined based on the two electrical signals generated by the two photoelectric sensors.

Step 203: determining a current rotation angle of the focusing wheel based on the number of level jumps of the first electrical signal or the number of level jumps of the second electrical signal.

In Step 203, the processor determines the current rotation angle of the focusing wheel based on the number of level jumps of the first electrical signal or the number of level jumps of the second electrical signal.

The number of level jumps is the number of times when the level jumps. Level jump includes a jump from high level to low level and a jump from low level to high level. In this step, the level jump used during the determination of the current rotation angle of the focusing wheel is a jump from high level to low level or from low level to high level.

In this step, the processor of the imaging device determines the rotation angle of the focusing wheel based on the level jump of the electrical signal generated by one of the two photoelectric sensors to further determine a focusing distance of the lens.

In an implementation, the current rotation angle of the focusing wheel is equal to the number of level jumps multiplied by a grating period angle, wherein the grating period angle is a corresponding angle of one grating period on the inner sidewall of the focusing wheel, and one grating period consists of one grating and one adjacent grating gap.

Specifically, the current rotation angle of the focusing wheel is determined according to the following formula:

$$\beta = n * \theta;$$

wherein, $\beta$ is the current rotation angle of the focusing wheel, n is the number of level jumps of the first electrical signal or the number of level jumps of the second electrical signal, and $\theta$ is a grating period angle.

Figure 5:
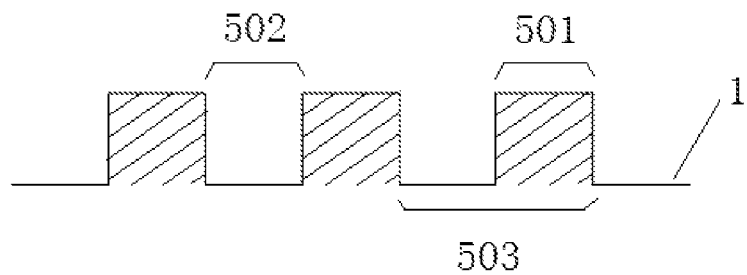
FIG. 5 is a schematic diagram of a grating and a grating gap provided by an embodiment of the present application.
Figure 6:
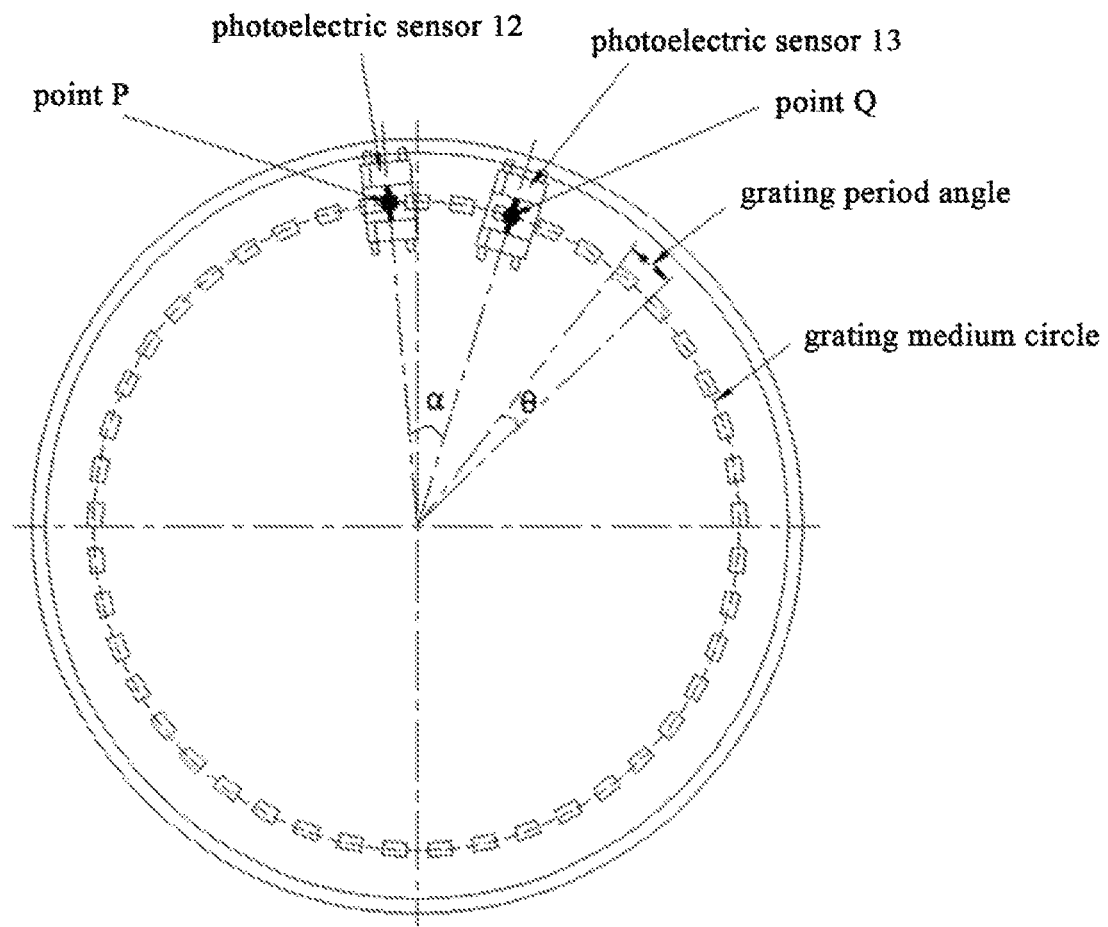
FIG. 6 is a schematic diagram of a position of a photoelectric sensor provided by an embodiment of the present application.

As shown in FIGS. 5 and 6, FIG. 5 is a schematic diagram of a grating and a grating gap provided by an embodiment of the present application, and FIG. 6 is a schematic diagram of a position of a photoelectric sensor provided by an embodiment of the present application. In FIG. 5, 1 represents a focusing wheel, grating 501 is a block-shaped shadow portion on the focusing wheel 1, grating gap 502 is an interval between adjacent gratings 501, and 503 represents one grating period. In FIG. 6, the grating 501 is an annular grating, and $\theta$ is a grating period angle, that is, $\theta$ is a tooth period angle.

In FIG. 6, the quadrangles uniformly distributed on the grating medium circle are gratings 501. Specifically, the number of level jumps of the first electrical signal or the number of level jumps of the second electrical signal may be calculated based on the number of rising edges or falling edges of the first electrical signal or the second electrical signal.

In other words, the number of level jumps of the first electrical signal can be calculated based on the number of rising edges or falling edges of the first electrical signal. The number of level jumps of the second electrical signal can be calculated based on the number of rising edges or falling edges of the second electrical signal. The number of level jumps is equal to the number of rising edges or the number of falling edges.

In this way, the more the number of level jumps of the first electrical signal or the number of level jumps of the second electrical signal, the greater the current rotation angle of the calculated focusing wheel, and in turn the further the focusing distance of the lens.

For example, when the number of rising edges of the first electrical signal is 10 and the grating period angle is 3 degrees, it can be determined that the number of level jumps of the first electrical signal is 10 and the current rotation angle of the focusing wheel is 10*3=30 degrees. In the embodiment of the present application, the number of rising edges or falling edges of the electrical signals generated by the two photoelectric sensors may also be comprehensively considered to determine the current rotation angle of the focusing wheel.

After determining the current rotation direction and the current rotation angle of the focusing wheel, the processor can drive a motor to focus the lens according to the current rotation direction and the current rotation angle of the focusing wheel.

It can be seen that the lens focusing method provided by the embodiment of the present application can determine the current rotation direction and the current rotation angle of the focusing wheel by means of photoelectric sensors. In this way, the focusing direction and the focusing distance of the lens can be determined based on the determined current rotation direction and the current rotation angle of the focusing wheel, thereby achieving lens focusing. The lens focusing device using photoelectric sensors has a simple structure with a small number of parts, and reduced processing difficulty, which not only reduces the cost of the device, but also meets the needs of mass production.

In an optional implementation, after step 203 in the method for determining a lens focusing parameter shown in FIG. 2, the method may further include: driving a motor to focus the lens based on the current rotation direction and the current rotation angle of the focusing wheel.

Specifically, driving a motor to focus the lens based on the current rotation direction and the current rotation angle of the focusing wheel may include:

determining a current focusing direction of the lens based on a first parameter configuration and the current rotation direction of the focusing wheel;

determining a current focusing distance of the lens based on a second parameter configuration and the current rotation angle of the focusing wheel;

driving a motor to focus the lens based on the current focusing direction and the current focusing distance of the lens.

Wherein, the first parameter configuration contains a correspondence between the rotation direction of the focusing wheel and the focusing direction of the lens. When the rotation direction of the focusing wheel is clockwise or counterclockwise, the focusing direction of the lens is moving along an axial direction. The focusing direction of the lens includes axial zoom in and axial zoom out.

The second parameter configuration contains a correspondence between the rotation angle of the focusing wheel and the focusing distance of the lens.

Specifically, after determining the current rotation direction of the focusing wheel, the processor may determine the focusing direction of the lens in the axial direction based on the first parameter configuration. The first parameter configuration specifies a correspondence between the rotation direction of the focusing wheel and the focusing direction of the lens. For example, when the rotation direction of the focusing wheel is clockwise, the focusing direction of the lens is axial zoom in; when the rotation direction of the focusing wheel is counterclockwise, the focusing direction of the lens is axial zoom out.

In an optional implementation the first parameter configuration may further specify a correspondence between the focusing direction of the lens and the rotation direction of the motor. For example, when the focusing direction of the lens is axial zoom in, the rotation direction of the motor is clockwise; when the focusing direction of the lens is axial zoom out, the rotation direction of the motor is counterclockwise.

Similarly, after determining the current rotation angle of the focusing wheel, the processor may determine the focusing distance of the lens in the axial direction based on the second parameter configuration. The second parameter configuration specifies a correspondence between the rotation angle of the focusing wheel and the focusing distance of the lens. For example, it is specified that the corresponding focusing distance of the lens is 0.1 cm if the focusing wheel rotates by 5 degrees. When the rotation angle of the focusing wheel is 10 degrees, the corresponding focusing distance of the lens is 0.2 cm.

In an optional implementation, the second parameter configuration may also specify a correspondence between the focusing distance of the lens and the number of rotations of the motor. For example, it is specified that the focusing distance of the lens is 0.1 cm and the rotation of the motor is 1 turn. In this way, when the focusing distance of the lens is 0.2 cm, the number of rotations of the motor is 2 turns.

After the processor determines the focusing direction and focusing distance of the lens, the motor can accurately focus the lens based on the determined focusing distance and focusing direction.

Thus, the processor firstly determines the rotation direction and rotation angle of the focusing wheel based on the electrical signals generated by the two photoelectric sensors, and then determines the current focusing direction and the current focusing distance of the lens based on the current rotation direction and current rotation angle of the focusing wheel as well as the first parameter configuration and the second parameter configuration, such that the motor can focus the lens accurately based on the determined current focusing direction and current focusing distance.

Figure 7:
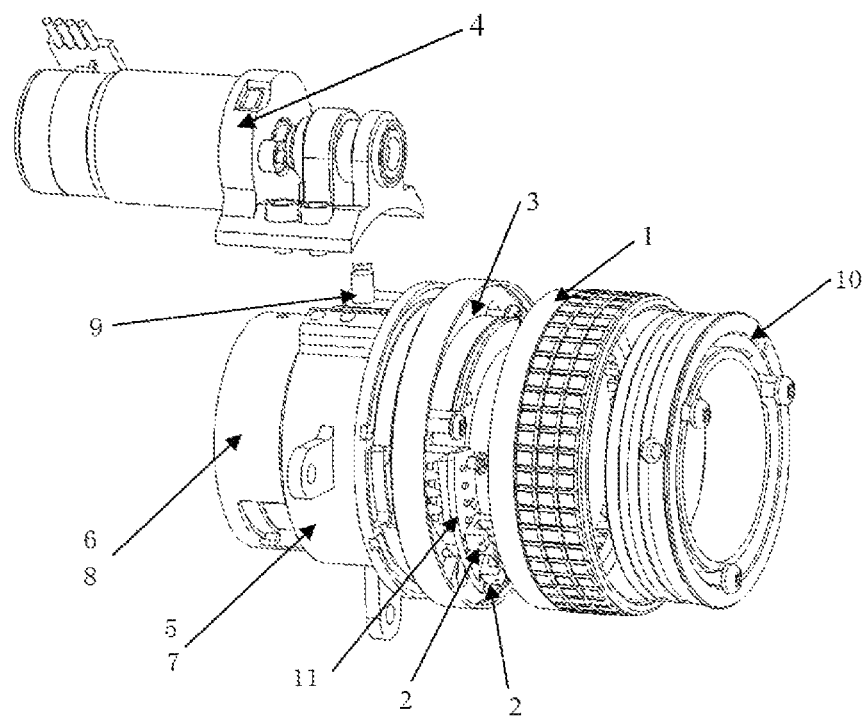
FIG. 7 is a first schematic diagram of an imaging device provided by an embodiment of the present application.
Figure 8:
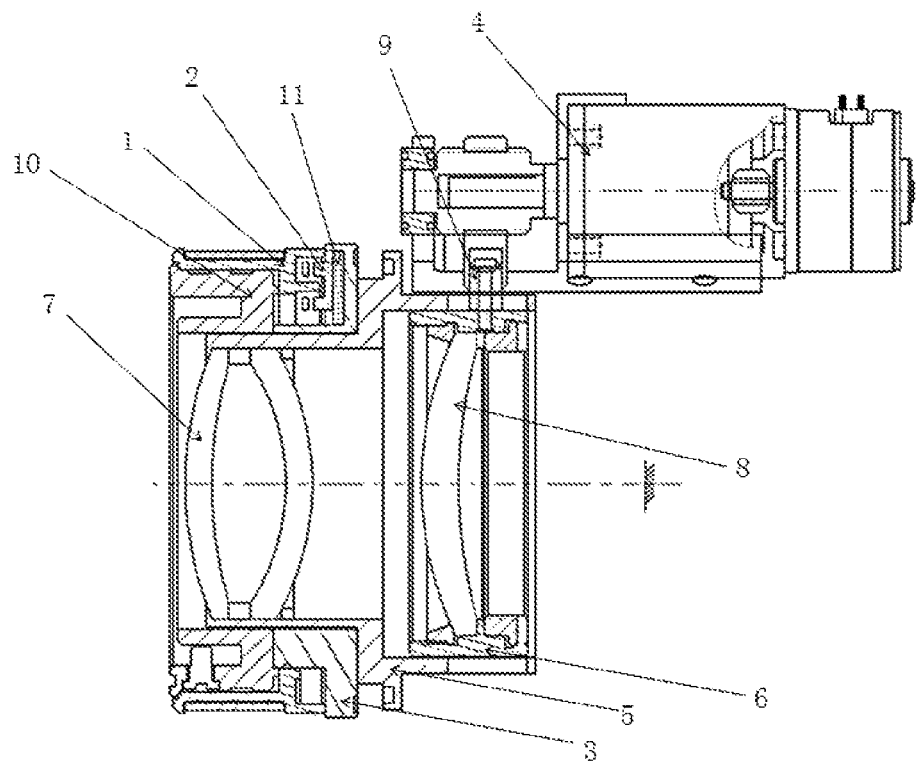
FIG. 8 is a second schematic diagram of an imaging device provided by an embodiment of the present application.
Figure 9:
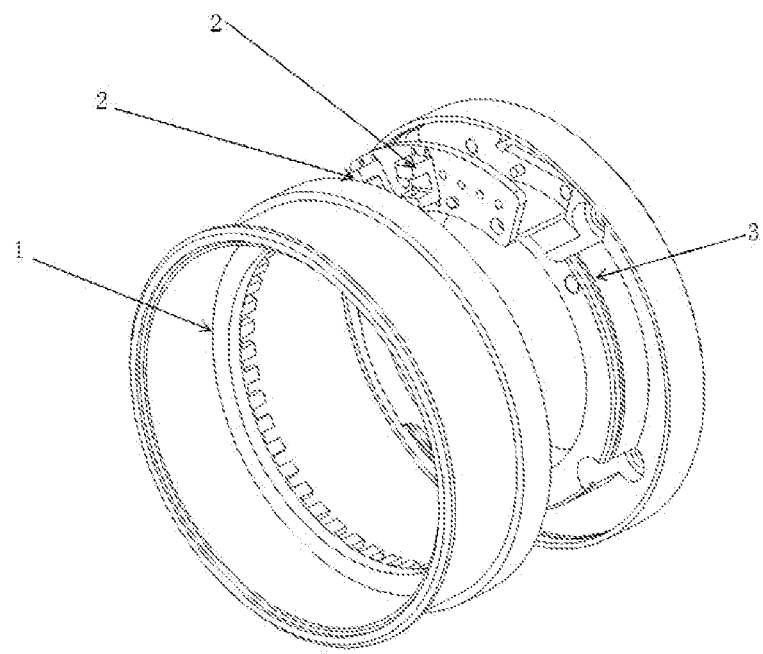
FIG. 9 is a first schematic diagram of a photoelectric sensor component provided by an embodiment of the present application.
Figure 10:
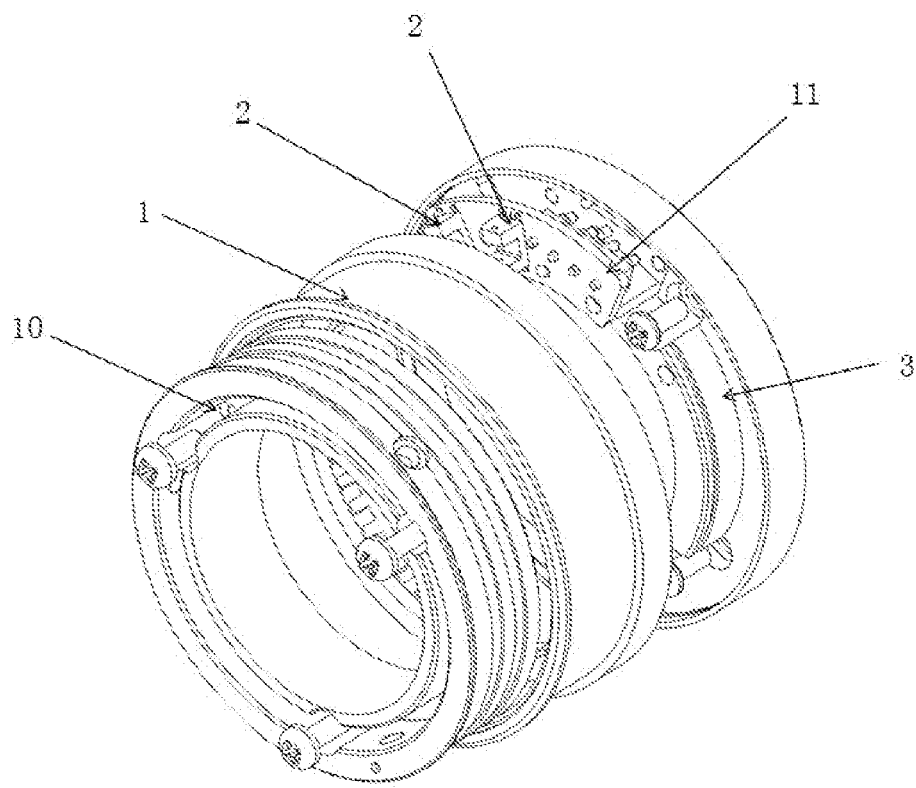
FIG. 10 is a second schematic diagram of a photoelectric sensor component provided by an embodiment of the present application.

In order to illustrate the lens focusing method provided by the embodiment of the present application clearly, the embodiment of the present application is described below with reference to FIG. 7 to FIG. 10. FIG. 7 is a first schematic diagram of a handheld infrared thermal imaging device provided by an embodiment of the present application, FIG. 8 is a second schematic diagram of a handheld infrared thermal imaging device provided by an embodiment of the present application, and FIG. 9 is a first schematic diagram of a photoelectric sensor component provided by an embodiment of the present application, FIG. 10 is a second schematic diagram of a photoelectric sensor component provided by an embodiment of the present application. The imaging device in the embodiments of the present application is not limited to the imaging device shown in FIG. 7 to FIG. 10.

As shown in FIG. 7 and FIG. 8, the imaging device includes a focusing wheel 1, two photoelectric sensors 2, a fixing member 3, a motor 4, a main lens barrel 5, a focusing lens barrel 6, and a first lens 7.

Wherein, the focusing lens barrel 6 is disposed within the main lens barrel 5 to be axially movable.

The first lens 7 is disposed fixedly within the main lens barrel 5.

The fixing member 3 is fixed on the outer sidewall of the main lens barrel 5 close to the motor 4. Two photoelectric sensors 2 are mounted on the fixing member 3. The focusing wheel 1 is rotatably mounted on the outer sidewall of the main lens barrel 5 away from the motor 4. A first gap exists between the focusing wheel 1 and the fixing member 3 along the axial direction of the main lens barrel 5.

The motor 4 is mounted on the outer sidewall of the main lens barrel 5.

As shown in FIG. 9, at least two gratings are provided on the inner sidewall of the focusing wheel 1, and grating gaps between two adjacent gratings are equal. The grating passes the two photoelectric sensors 2 when the focusing wheel 1 rotates.

The photoelectric sensor 2 is configured to generate an electrical signal and send the generated electrical signal to a processor. The electrical signal generated by the photoelectric sensor 2 changes when the grating passes the photoelectric sensor 2.

Specifically, the two photoelectric sensors 2 include a first photoelectric sensor and a second photoelectric sensor. The first photoelectric sensor generates a first electrical signal and sends the generated first electrical signal to the processor, and the second photoelectric sensor generates a second electrical signal and sends the generated second electrical signal to the processor.

The processor is electrically connected to the motor 4, and the processor is configured to drive the motor 4 to move the focusing lens barrel 6 according to the electrical signals sent by the photoelectric sensors 2.

Specifically, the processor drives the motor 4 to move the focusing lens barrel 6 according to the first electrical signal and the second electrical signal.

The first lens 7 fixed in the main lens barrel 5 may be immovable. In this way, the focusing lens barrel 6 can be driven by the motor 4 to move axially in the main lens barrel 5, so as to drive the focusing lens barrel 6 to move back and forth axially along the main lens barrel 5 to achieve lens focusing.

In order to enable the focusing wheel 1 to be sleeved and flexibly rotate on the outer sidewall of the main lens barrel 5 and enable the gratings to pass the photoelectric sensors 2 when the focusing wheel 1 rotates, a first gap exists between the focusing wheel 1 and the fixing member 3 along the axial direction of the main lens barrel 5.

When the focusing wheel 1 rotates, the gratings on the focusing wheel 1 pass two photoelectric sensors 2 in turn. At this time, the two photoelectric sensors 2 generate changing optical signals after sensing the change in light brightness caused due to the gratings pass the through-beam axis. Next, the two photoelectric sensors 2 respectively generate continuous and level-jumping electrical signals based on the generated optical signals, and send the generated electrical signals to the processor. Then, the processor determines the rotation direction of the focusing wheel 1 based on the level jumps of the two received electrical signals.

Figure 11:
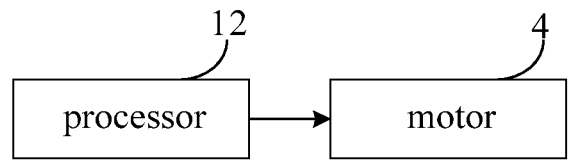
FIG. 11 is a schematic diagram of an electrical connection between a processor and a motor 4 provided by an embodiment of the present application.

The electrical connection relationship between the processor and the motor 4 is shown in FIG. 11, which is a schematic diagram of the electrical connection between the processor and the motor provided by an embodiment of the present application. In FIG. 11, when the photoelectric sensor 2 senses that a grating passes the photoelectric sensor 2, the electrical signal changes and is sent to the processor 12. The processor 12 drives the motor 4 to move the focusing lens barrel 6 according to the received electrical signal, thereby achieving lens focusing.

It can be seen that the imaging device provided by the embodiment of the present application can perform focusing by means of photoelectric sensors, which not only has a simple structure with a small number of parts, but also has reduced processing difficulty and reduces the cost of the device.

In an implementation, as shown in FIG. 7 and FIG. 8, the imaging device may further include a second lens 8. The second lens 8 is disposed fixedly within the focusing lens barrel 6.

In this way, when the focusing lens barrel 6 moves back and forth in the axial direction along the main lens barrel 5, the second lens located in the focusing lens barrel 6 can be driven to move back and forth in the axial direction along the main lens barrel 5. Lens focusing is realized by changing the relative position between the second lens 8 and the first lens 7.

In an implementation, as shown in FIG. 7 and FIG. 8, the imaging device may further include a pin 9. The motor 4 is connected to the focusing lens barrel 6 via the pin 9. The motor 4 is used to drive the focusing lens barrel 6 by means of the pin 9 to move axially so as to adjust the relative position between the second lens 8 and the first lens 7.

Thus, when the processor drives the motor 4 to work according to the received electrical signals, the motor 4 can drive the focusing lens barrel 6 by means of the pin 9 to move along the axial direction of the main lens barrel 5 so as to adjust the relative position between the second lens 8 and the first lenses 7, thus achieving lens focusing.

In an implementation, a first gap between the focusing wheel 1 and the fixing member 3 in the axial direction of the main lens barrel 5 has a preset distance, and when the first gap has a preset distance, a grating passes the photoelectric sensor 2 while the focusing wheel 1 rotates.

Specifically, the first gap between the focusing wheel 1 and the fixing member 3 in the axial direction of the main lens barrel 5 may be set to have a preset distance. This is to enable the focusing wheel 1 to rotate flexibly, and when the focusing wheel 1 rotates, a grating can pass the photoelectric sensor 2, so that the photoelectric sensor 2 generates an electrical signal.

In one implementation, the fixing member 3 is sleeved fixedly on the outer sidewall of the main lens barrel 5 close to the motor 4. The focusing wheel 1 is sleeved rotatably on the outer sidewall of the main lens barrel 5 away from the motor 4. A second gap exists between the focusing wheel 1 and the outer sidewall of the main lens barrel 5.

Specifically, the fixing member 3 and the focusing wheel 1 are both mounted on the main lens barrel 5, and the fixing member 3 may be fixed on the main lens barrel 5 by means of a screw structure, a rivet structure, or other methods. In order to enable the focusing wheel 1 to rotate flexibly, the focusing wheel 1 is rotatably mounted on the outer sidewall of the main lens barrel 5 and a second gap exists between the focusing wheel 1 and the outer sidewall of the main lens barrel 5. In contrast, the fixing member 3 is closer to the outer sidewall of the main lens barrel 5 than the focusing wheel 1.

In an implementation, as shown in FIG. 7 and FIG. 8, the imaging device may further include a focusing pressure ring 10.

The focusing pressure ring 10 is connected to the fixing member 3.

The focusing pressure ring 10 is sleeved on the outer sidewall of the main lens barrel 5. The focusing wheel 1 is sleeved on the outer sidewall of the focusing pressure ring 10.

In order to further illustrate the mounting positions of the focusing pressure ring 10, the focusing wheel 1 and the fixing member 3, reference is made to FIG. 10. As shown in FIG. 10, the focusing pressure ring 10 and the fixing member 3 may be connected by a screw structure. The focusing pressure ring 10 is disposed between the focusing wheel 1 and the main lens barrel 5 through the fixing member 3. The focusing pressure ring 10 is used to fix the focusing wheel 1 with a gap, so that the focusing wheel 1 can rotate flexibly without falling off the main lens barrel 5, thus ensuring that the grating on the focusing wheel 1 can pass the photoelectric sensor 2 accurately when the focusing wheel 1 rotates.

Optionally, the focusing pressure ring 10 and the fixing member 3 are both made of hard material, which may be metal, hard plastic, or other hard materials.

In one implementation, the positions of the two photoelectric sensors 2 on the fixing member 3 form a preset angle. The two photoelectric sensors 2 are mounted on the fixing member 3, and the positions of the two photoelectric sensors 2 on the fixing member 3 are adjustable.

Optionally, the distance between the positions of the two photoelectric sensors 2 on the fixing member 3 is greater than or equal to one grating period, and one grating period includes the sum of the width of a grating and the width of a grating gap.

As shown in FIG. 7, FIG. 8, and FIG. 10, the handheld infrared thermal imaging device further includes a PCB board 11.

The PCB board 11 is fixedly mounted on the fixing member 3. The two photoelectric sensors 2 are mounted on a PCB board 11.

Specifically, the photoelectric sensors 2 send the generated electrical signals to the processor through a circuit on the PCB board 11, wherein the photoelectric sensors 2 are electrically connected to the processor through the PCB board 11. Thus, the processor can focus the focusing lens barrel 6 according to the electrical signals generated by the photoelectric sensors 2.

Moreover, as can be seen from FIG. 10, the photoelectric sensor 2 can be defined in position by the protrusions present on the PCB board 11. For example, there are four protrusions on the PCB board 11, these four protrusions are fixed on the PCB board 11 by welding and the like, and the photoelectric sensors 2 are fixed at the positions of the protrusions on the PCB board 11, and the fixed positions of the photoelectric sensors 2 on PCB board 11 can be adjusted according to actual needs.

As shown in FIG. 9, the gratings are distributed over the entire circumference of the inner sidewall of the focusing wheel 1. Alternatively, the gratings may be distributed over a part of the circumference of the inner sidewall of the focusing wheel 1.

In other words, when the gratings are distributed over the entire circumference of the inner sidewall of the focusing wheel 1, a plurality of gratings form an annular grating. When the gratings are distributed over a part of the circumference of the inner sidewall of the focusing wheel 1, a plurality of gratings form a circular-arc grating. In practical applications, the gratings can be set according to specific needs.

When the focusing wheel 1 rotates, the gratings on the focusing wheel 1 pass two photoelectric sensors 2 in sequence. When the gratings pass the photoelectric sensors 2, the optical signals change due to the obstruction of the through-beam axes by the gratings. Next, the photoelectric sensors 2 generate electrical signals with a changing level status based on the changing optical signals, and send the generated electrical signals with a changing level status to the processor. Then, the processor determines the current rotation direction and the current rotation angle of the focusing wheel 1 based on the two received electrical signals.

Figure 12:
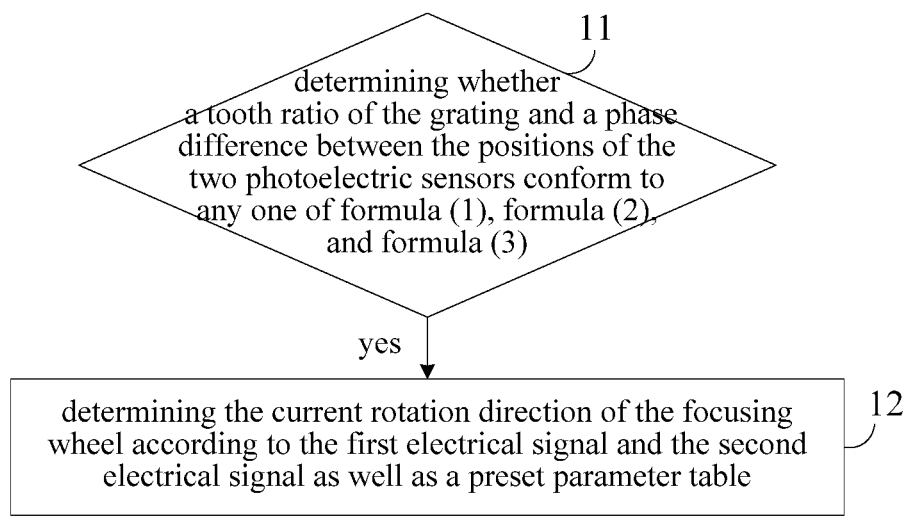
FIG. 12 is a specific flowchart of step 202 in an embodiment of the present application.

In an implementation, referring to FIG. 12, FIG. 12 is a specific flowchart of step 202 in the embodiment of the present application. Step 202 in the method for determining a lens focusing parameter shown in FIG. 2 may specifically include the following substeps:

Sub-step 11, determining whether a tooth ratio of the grating and a phase difference between the positions of the two photoelectric sensors conform to any one of formula (1), formula (2), and formula (3); if yes, executing Sub-step 12. Wherein, the tooth ratio of the grating is a grating ratio. The grating ratio is the ratio of the width of one grating to the width of one grating period, and one grating period consists of one grating and one adjacent grating gap.

In this step, the processor of the imaging device determines whether the grating ratio and the phase difference between the positions of the two photoelectric sensors in the currently used imaging device with respect to the grating period conform to limiting conditions on the grating ratio and the phase difference between the positions of the two photoelectric sensors on the fixing member with respect to the grating period in a preset parameter table. Specifically, the limiting conditions require that the grating ratio is a preset value, and the phase difference between the positions of the two photoelectric sensors on the fixing member with respect to the grating period is a preset phase difference.

For convenience of description, the phase difference between the positions of the two photoelectric sensors on the fixing member with respect to the grating period is referred to as the phase difference between the two photoelectric sensors. The preset phase difference between the positions of the two photoelectric sensors on the fixing member with respect to the grating period is referred to as the preset phase difference between the two photoelectric sensors.

In other words, the parameter table may further include a preset phase difference between the two photoelectric sensors. When the two photoelectric sensors are mounted on the fixing member, the current phase difference between the two photoelectric sensors conforms to a preset phase difference and the grating ratio is also equal to a preset value, the processor determines the current rotation direction of the focusing wheel based on the first electrical signal and the second electrical signal and a reference table.

In the embodiment of the present application, the current phase difference between the two photoelectric sensors can be calculated based on the grating period angle and the angle between the positions of the two photoelectric sensors on the fixing member.

The limiting conditions are shown in formula (1), formula (2), and formula (3). Formula (1), formula (2), and formula (3) all contain a preset value of the grating ratio and a preset phase difference between the two photoelectric sensors. As long as the grating ratio and the current phase difference between the two photoelectric sensors conform to the preset value of the grating ratio and the preset phase difference defined in any one of the formulas, it means that the grating ratio and the current phase difference between the positions of the two photoelectric sensors on the fixing member with respect to the grating period meet the limiting conditions.

$$\begin{cases} d = 0.5 \\ \omega \neq 0° \text{ and } \omega \neq 180° \end{cases} \quad (1)$$

$$\begin{cases} 0 < d < 0.5 \\ 0 < \omega \leq d \times 360°, \text{ or } (1-d) \times 360° \leq \omega < 360° \end{cases} \quad (2)$$

$$\begin{cases} 0.5 < d < 1 \\ d \times 360° \leq \omega < 360°, \text{ or } 0 < \omega \leq (1-d) \times 360° \end{cases} \quad (3)$$

Wherein, d represents the grating ratio, and ω represents the preset phase difference between the two photoelectric sensors.

For the current phase difference between the two photoelectric sensors, the processor of the imaging device can calculate the current phase difference between the positions of the two photoelectric sensors on the fixing member based on the relative positions of the two photoelectric sensors on the fixing member, that is, the angle between the positions of the two photoelectric sensors on the fixing member.

As shown in FIG. 6, in FIG. 6, the radius of the grating medium circle of the annular grating is R. The two photoelectric sensors 12 and 13 are located on the grating medium circle. The intersection point of the through-beam axis of the photoelectric sensor 12 and the grating medium circle is P, and the intersection point of the through-beam axis of the photoelectric sensor 13 and the grating medium circle is Q. The phase of point P in the grating period is ω1, and the phase of point Q in the grating period is ω2. Then, the absolute value of the phase difference between points P and Q is |ω1−ω2|. In other words, the current phase difference between the photoelectric sensor 12 and photoelectric sensor 13 with respect to the grating period is ω=|ω1−ω2|. For convenience of explanation, ω is hereinafter referred to as the current phase difference between the positions of the two photoelectric sensors on the fixing member.

The angle between the positions of the two photoelectric sensors 12 and 13 on the fixing member can be expressed as α. Specifically, the calculation relationship between the angle α between the positions of the two photoelectric sensors 12 and 13 on the fixing member and the current phase difference ω between the positions of the two photoelectric sensors 12 and 13 on the fixing member is shown in formula (4):

$$\omega = \left(\frac{\alpha}{\theta} - i\right) \times 360° \quad (4)$$

In formula (4), ω is the current phase difference between the positions of the two photoelectric sensors 12 and 13 on the fixing member; θ is one grating period angle; α is the angle between the positions of the two photoelectric sensors 12 and 13 on the fixing member; i=1, 2, 3 . . . , i is a natural number.

Thus, the processor can calculate the current phase difference between the positions of the two photoelectric sensors 12 and 13 on the fixing member based on the angle between the positions of the two photoelectric sensors 12 and 13 on the fixing member, and then determine whether the current phase difference conforms to any one of formulas (1) to (3).

Sub-step 12, determining the current rotation direction of the focusing wheel based on the first electrical signal and the second electrical signal as well as a preset parameter table.

In this step, when the processor of the imaging device determines that the grating ratio and the current phase difference between the two photoelectric sensors in the currently used imaging device conform to any one of the formula (1), formula (2), and formula (3), the current rotation direction of the focusing wheel can be determined based on the correspondence among the first electrical signal, the second electrical signal and the rotation direction of the focusing wheel in a preset parameter table.

In an implementation, the parameter table contains the correspondence among five consecutive level signals of the first electrical signal, five consecutive level signals of the second electrical signal corresponding to the first electrical signal, and the rotation direction of the focusing wheel, as shown in Table 1.

In other words, the current rotation direction of the focusing wheel can be determined based on five consecutive level signals of the first electrical signal and five consecutive level signals of the second electrical signal corresponding to the first electrical signal as well as a parameter table.

In an implementation, with respect to the grating period, the phase of the first photoelectric sensor is smaller than the phase of the second photoelectric sensor. That is, when the focusing wheel rotates clockwise, the grating firstly passes the first photoelectric sensor and then passes the second photoelectric sensor. At this time, the parameter table may specifically contain:

a correspondence among a first level status sequence of low-level, high-level, high-level, low-level and low-level of the first electrical signal, a second level status sequence of low-level, low-level, high-level, high-level and low-level of the second electrical signal, and a clockwise rotation direction;

a correspondence among a third level status sequence of low-level, low-level, high-level, high-level and low-level of the first electrical signal, a fourth level status sequence of low-level, high-level, high-level, low-level and low-level of the second electrical signal, and a counterclockwise rotation direction.

The correspondence in the parameter table is described below in detail in combination with formula (1) to formula (3):

First case: the grating ratio and the current phase difference between the two photoelectric sensors in the currently used imaging device conform to formula (1). When the temporal sequence of the level status of the first electrical signal within a time period is low level, high level, high level, low level, and low level, and the temporal sequence of the level status of the second electrical signal within this time period is low level, low level, high level, high level, and low level, it is determined that the current rotation direction of the focusing wheel is clockwise.

Figure 13:
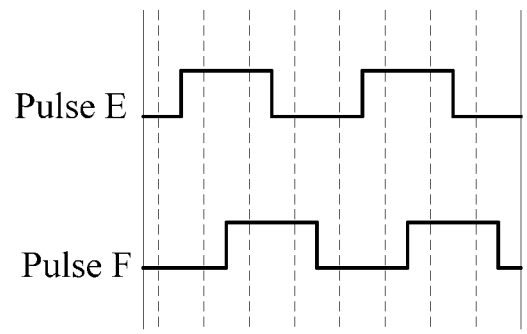
FIG. 13 is a second schematic diagram of electrical signals generated by two photoelectric sensors in an embodiment of the present application.

0 represents low level and 1 represents high level. Then, when the electrical signals generated by the first photoelectric sensor and the second photoelectric sensor are as shown in FIG. 13, it can be determined that the current rotation direction of the corresponding focusing wheel is clockwise. FIG. 13 is a second schematic diagram of electrical signals generated by two photoelectric sensors in the embodiment of the present application. As shown in FIG. 13, pulse E is the first electrical signal generated by the first photoelectric sensor, and pulse F is the second electrical signal generated by the second photoelectric sensor.

As can be seen from FIG. 13, when the level of the first electrical signal is 0, the level of the corresponding second electrical signal is 0; when the level of the first electrical signal jumps from 0 to 1, the level of the corresponding second electrical signal is 0; when the level of the first electrical signal is 1, the level of the corresponding second electrical signal jumps from 0 to 1; when the level of the first electrical signal jumps from 1 to 0, the level of the corresponding second electrical signal is 1; when the first electrical signal is 0, the level of the corresponding second electrical signal jumps from 1 to 0.

Second case: the grating ratio and the current phase difference between the two photoelectric sensors in the currently used imaging device conform to formula (2). When the temporal sequence of the level status of the first electrical signal within a time period is low level, high level, high level, low level, and low level, and the temporal sequence of the level status of the second electrical signal within this time period is low level, low level, high level, high level, and low level, it is determined that the current rotation direction of the focusing wheel is clockwise.

Figure 14:
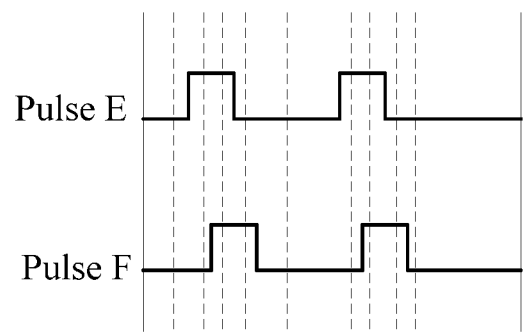
FIG. 14 is a third schematic diagram of electrical signals generated by two photoelectric sensors in an embodiment of the present application.

When the level jump patterns of the electrical signals generated by the first photoelectric sensor and the second photoelectric sensor are as shown in FIG. 14, it can be determined that the current rotation direction of the focusing wheel is clockwise. FIG. 14 is a third schematic diagram of electrical signals generated by two photoelectric sensors in the embodiment of the present application. It can be seen from FIG. 14 that the level jump patterns of the electrical signals shown in FIG. 14 are the same as those of the electrical signals shown in FIG. 13, with one exception of different time interval of the level jumps of the electrical signals.

Third case: the grating ratio and the current phase difference between the two photoelectric sensors in the currently used imaging device conform to formula (3). When the temporal sequence of the level status of the first electrical signal within a time period is low level, high level, high level, low level, and low level, and the temporal sequence of the level status of the second electrical signal within this time period is low level, low level, high level, high level, and low level, it is determined that the current rotation direction of the focusing wheel is clockwise.

Figure 15:
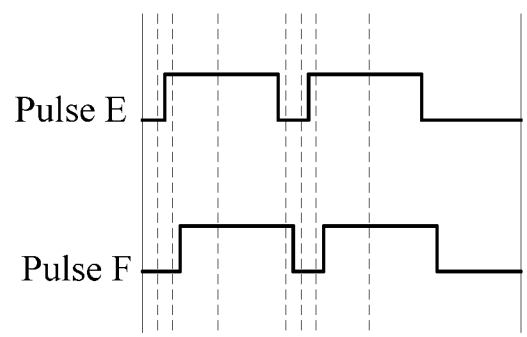
FIG. 15 is a fourth schematic diagram of electrical signals generated by two photoelectric sensors in an embodiment of the present application.

When the level jump patterns of the electrical signals generated by the first photoelectric sensor and the second photoelectric sensor are as shown in FIG. 15, it can be determined that the current rotation direction of the focusing wheel is clockwise. FIG. 15 is a fourth schematic diagram of the electrical signals generated by two photoelectric sensors in the embodiment of the present application. It can be seen from FIG. 15 that the level jump patterns of the electrical signals shown in FIG. 15 are the same as those of the electrical signals shown in FIG. 13 and FIG. 14, with one exception of different time interval of the level jumps of the electrical signals.

Fourth case: the grating ratio and the current phase difference between the two photoelectric sensors in the currently used imaging device conform to formula (1). When the temporal sequence of the level status of the first electrical signal within a time period is low level, low level, high level, high level, and low level, and the temporal sequence of the level status of the second electrical signal within this time period is low level, high level, high level, low level, and low level, it is determined that the current rotation direction of the focusing wheel is counterclockwise.

Figure 16:
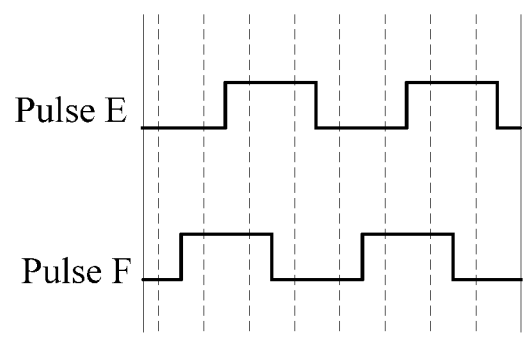
FIG. 16 is a fifth schematic diagram of electrical signals generated by two photoelectric sensors in the embodiment of the present application.

When the level jump patterns of the electrical signals generated by the first photoelectric sensor and the second photoelectric sensor are as shown in FIG. 16, it can be determined that the current rotation direction of the focusing wheel is counterclockwise. FIG. 16 is a fifth schematic diagram of the electrical signals generated by two photoelectric sensors in the embodiment of the present application.

It can be seen from FIG. 16 that when the level of the first electrical signal is 0, the level of the corresponding second electrical signal is 0; when the level of the first electrical signal is 0, the level of the corresponding second electrical signal jumps from 0 to 1; when the level of the first electrical signal jumps from 0 to 1, the level of the corresponding second electrical signal is 1; when the level of the first electrical signal is 1, the level of the second electrical signal jumps from 1 to 0; when the level of the first electrical signal jumps from 1 to 0, the level of the corresponding second electrical signal is 0.

Fifth case: the grating ratio and the current phase difference between the two photoelectric sensors in the currently used imaging device conform to formula (2). When the temporal sequence of the level status of the first electrical signal within a time period is low level, low level, high level, high level, and low level, and the temporal sequence of the level status of the second electrical signal within this time period is low level, high level, high level, low level, and low level, it is determined that the current rotation direction of the focusing wheel is counterclockwise.

Figure 17:
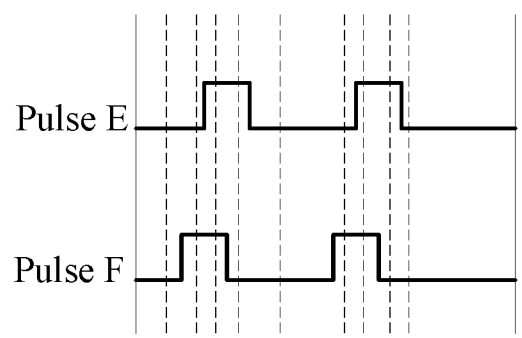
FIG. 17 is a sixth schematic diagram of electrical signals generated by two photoelectric sensors in an embodiment of the present application.

When the level jump patterns of the electrical signals generated by the first photoelectric sensor and the second photoelectric sensor are as shown in FIG. 17, it can be determined that the current rotation direction of the focusing wheel is counterclockwise. FIG. 17 is a sixth schematic diagram of the electrical signals generated by two photoelectric sensors in the embodiment of the present application.

It can be seen from FIG. 17 that the level jump patterns of the electrical signals shown in FIG. 17 are the same as those of the electrical signals shown in FIG. 16, with one exception of different time interval of the level jumps of the electrical signals.

Sixth case: the grating ratio and the current phase difference between the two photoelectric sensors in the currently used imaging device conform to formula (3). When the temporal sequence of the level status of the first electrical signal within a time period is low level, low level, high level, high level, and low level, and the temporal sequence of the level status of the second electrical signal within this time period is low level, high level, high level, low level, and low level, it is determined that the current rotation direction of the focusing wheel is counterclockwise.

Figure 18:
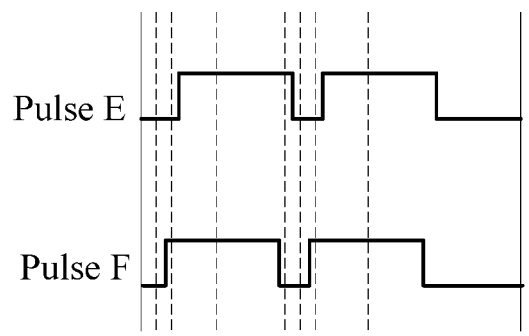
FIG. 18 is a seventh schematic diagram of electrical signals generated by two photoelectric sensors in an embodiment of the present application.

When the level jump patterns of the electrical signals generated by the first photoelectric sensor and the second photoelectric sensor are as shown in FIG. 18, it can be determined that the current rotation direction of the focusing wheel is counterclockwise. FIG. 18 is a seventh schematic diagram of the electrical signals generated by two photoelectric sensors in the embodiment of the present application.

It can be seen from FIG. 18 that the level jump patterns of the electrical signals shown in FIG. 18 are the same as those of the electrical signals shown in FIGS. 16 and 17, with one exception of different time interval of the level jumps of the electrical signals.

In summary, based on the level jump patterns shown in FIGS. 13 to 18, it can be determined that under the premise that the grating ratio and the current phase difference between the two photoelectric sensors in the currently used imaging device conform to any one of formula (1) to formula (3), the correspondence between the electrical signals generated by the first photoelectric sensor and the second photoelectric sensor and the rotation direction of the focusing wheel can be shown in Table 2.

TABLE 2

| rotation direction of focusing wheel | electrical signals generated by two photoelectric sensors | | | | | converted signal |
|---|---|---|---|---|---|---|
| clockwise | 00 | 10 | 11 | 01 | 00 | 0-2-3-1-0 |
| counterclockwise | 00 | 01 | 11 | 10 | 00 | 0-1-3-2-0 |

In Table 2, for each pair of electrical signals, the former is the level status of the first electrical signal generated by the first photoelectric sensor, and the latter is the level status of the second electrical signal generated by the second photoelectric sensor. For example, for the electrical signal 10, 1 is the level status of the first electrical signal, and 0 is the level status of the second electrical signal.

In order to facilitate the processor to process the level jumps of the electrical signals, the electrical signals expressed in the form of 0 and 1 may be converted into a decimal number. For example, the converted signal for the electrical signal 10 is a decimal number 2. Thus, when the processor receives a converted signal 0-2-3-1-0 sent by the PCB board, it can be determined that the rotation direction of the focusing wheel is clockwise; when the processor receives a converted signal 0-1-3-2-0 sent by the PCB board, it can be determined that the rotation direction of the focusing wheel is counterclockwise.

In a possible implementation, the phase of the first photoelectric sensor with respect to the grating period is smaller than the phase of the second photoelectric sensor with respect to the grating period, and the grating period angle and the current phase difference between the two photoelectric sensors are set based on any one of formulas (1)-(3). At this time, the parameter table contains:

the correspondence among a first level status sequence of low-level, high-level, high-level, low-level and low-level of the first electrical signal, a second level status sequence of low-level, low-level, high-level, high-level and low-level of the second electrical signal, and the clockwise rotation direction;

the correspondence among a third level status sequence of low-level, low-level, high-level, high-level, and low-level of the first electrical signal, a fourth level status sequence of low-level, high-level, high-level, low-level and low-level of the second electrical signal, and the counterclockwise rotation direction.

The processor receives the first electrical signal and the second electrical signal. For the two electrical signals of the first electrical signal and the second electrical signal, if a first position is the same as a second position, it is determined that the current rotation direction of the focusing wheel is clockwise. Wherein, the first position is the position of two adjacent level statuses of the first electrical signal in the first level status sequence, and the second position is the position of two adjacent level statuses of the second electrical signal in the second level status sequence.

For example, if two adjacent level statuses in the first electrical signal are 0→1 and two adjacent level statuses in the first electrical signal are 0→0 (i.e., as shown in Table 2, when the level statuses of the first electrical signal and the second electrical signal is 00→10), it is determined that the first position is the same as the second position and the current rotation direction of the focusing wheel is clockwise.

If two adjacent level statuses in the first electrical signal are 1→1 and two adjacent level statuses in the first electrical signal are 0→1 (i.e., as shown in Table 2, the level statuses of the first electrical signal and the second electrical signal is 10→11), it is determined that the first position is the same as the second position and the current rotation direction of the focusing wheel is clockwise.

If two adjacent level statuses in the first electrical signal are 10 and two adjacent level statuses in the first electrical signal are 1→1 (i.e., as shown in Table 2, the level statuses of the first electrical signal and the second electrical signal is 11→01), it is determined that the first position is the same as the second position and the current rotation direction of the focusing wheel is clockwise.

If two adjacent level statuses in the first electrical signal are 0→0 and two adjacent level statuses in the first electrical signal are 1→0 (i.e., as shown in Table 2, the level statuses of the first electrical signal and the second electrical signal is 01→00), it is determined that the first position is the same as the second position and the current rotation direction of the focusing wheel is clockwise.

The processor receives the first electrical signal and the second electrical signal. For the two electrical signals of the first electrical signal and the second electrical signal, if a third position is the same as a fourth position, it is determined that the current rotation direction of the focusing wheel is counterclockwise. The third position is the position of two adjacent level statuses of the first electrical signal in the third level status sequence, and the fourth position is the position of two adjacent level statuses of the second electrical signal in the fourth level status sequence.

For example, if two adjacent level statuses in the first electrical signal are 0→0 and two adjacent level statuses in the first electrical signal are 0→1 (i.e., as shown in Table 2, when the level statuses of the first electrical signal and the second electrical signal is 00→01), it is determined that the third position is the same as the fourth position and the current rotation direction of the focusing wheel is counterclockwise.

If two adjacent level statuses in the first electrical signal are 0→1 and two adjacent level statuses in the first electrical signal are 1→1 (i.e., as shown in Table 2, the level statuses of the first electrical signal and the second electrical signal is 01→11), it is determined that the third position is the same as the fourth position and the current rotation direction of the focusing wheel is counterclockwise.

If two adjacent level statuses in the first electrical signal are 1→1 and two adjacent level statuses in the first electrical signal are 1→0 (i.e., as shown in Table 2, the level statuses of the first electrical signal and the second electrical signal is 11→10), it is determined that the third position is the same as the fourth position and the current rotation direction of the focusing wheel is counterclockwise.

If two adjacent level statuses in the first electrical signal are 1→0 and two adjacent level statuses in the first electrical signal are 0→0 (i.e., as shown in Table 2, the level statuses of the first electrical signal and the second electrical signal is 10→00), it is determined that the third position is the same as the fourth position and the current rotation direction of the focusing wheel is counterclockwise.

It can be seen that, in the embodiment of the present application, the correspondence among the electrical signals generated by the first photoelectric sensor and the second photoelectric sensor respectively and the rotation direction of the focusing wheel can be determined based on the grating ratio and the current phase difference between the two photoelectric sensors in the imaging device actually in use, so as to determine the current rotation direction of the focusing wheel based on the electrical signals actually generated by the first photoelectric sensor and the second photoelectric sensor, thus achieving precise focusing of a lens.

Figure 19:
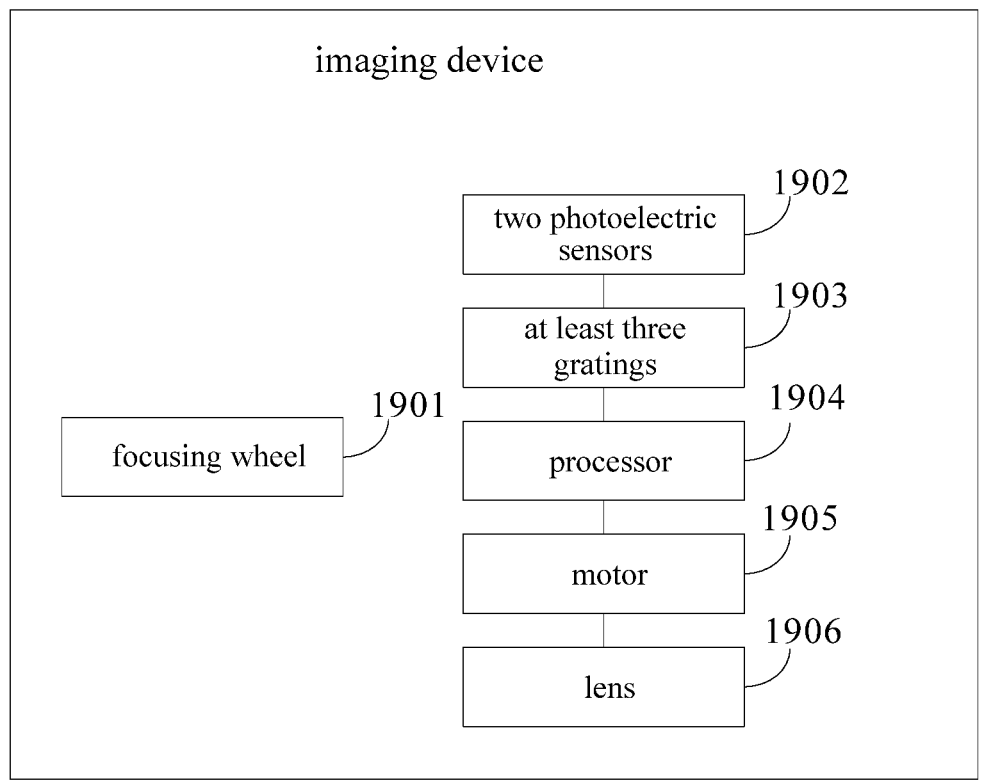
FIG. 19 is a schematic diagram of an imaging device provided by an embodiment of the present application.

Based on the same inventive concept, correspondingly to the above embodiments of the lens focusing method, an embodiment of the present application further provides an imaging device. Referring to FIG. 19, FIG. 19 is a schematic diagram of the imaging device provided by an embodiment of the present application. As shown in FIG. 19, the imaging device includes a focusing wheel 1901, two photoelectric sensors 1902, at least three gratings 1903, a processor 1904, a motor 1905, and a lens 1906. Wherein the gratings 1903 are distributed on an inner sidewall of the focusing wheel 1901, grating gaps having a same width exist between adjacent gratings 1903. When the focusing wheel 1901 rotates, a grating of the at least three gratings 1903 passes two photoelectric sensors 1902.

Wherein, the processor 1904 is configured to determine a first electrical signal generated by a first photoelectric sensor of the two photoelectric sensors 1902, wherein the first electrical signal changes when a grating of the at least three gratings 1903 passes the first photoelectric sensor;

the processor 1904 is configured to determine a second electrical signal generated by a second photoelectric sensor of the two photoelectric sensors 1902, wherein the second electrical signal changes when a grating of the at least three gratings 1903 passes the second photoelectric sensor;

the processor 1904 is configured to determine a current rotation direction of the focusing wheel 1901 based on the first electrical signal and the second electrical signal as well as a preset parameter table, wherein the parameter table contains a correspondence among the first electrical signal, the second electrical signal, and a rotation direction of the focusing wheel 1901;

the processor 1904 is configured to determine a current rotation angle of the focusing wheel 1901 based on the number of level jumps of the first electrical signal or the number of level jumps of the second electrical signal, wherein the level jump is a jump from high level to low level or a jump from low level to high level;

the processor 1904 is configured to drive the motor 1905 to focus the lens 1906 according to the current rotation direction and the current rotation angle of the focusing wheel 1901.

Optionally, the processor 1904 is further configured to determine a current focusing direction of the lens 1906 based on a first parameter configuration of the lens 1906 and the current rotation direction of the focusing wheel 1901, wherein the first parameter configuration includes a correspondence between a rotation direction of the focusing wheel 1901 and a focusing direction of the lens 1906, the focusing direction of the lens 1906 includes axial zoom in and axial zoom out;

the processor 1904 is further configured to determine a current focusing distance of the lens 1906 based on a second parameter configuration of the lens 1906 and the current rotation angle of the focusing wheel 1901, wherein the second parameter configuration includes a correspondence between the rotation direction of the focusing wheel 1901 and the focusing direction of the lens 1906;

the processor 1904 is further configured to drive the motor 1905 to focus the lens 1906 based on the current focusing direction and the current focusing distance of the lens 1906.

Optionally, the current rotation angle of the focusing wheel 1901 is equal to the number of level jumps multiplied by one grating period angle, wherein the grating period angle is an angle of one grating period on the inner sidewall of the focusing wheel 1901, and one grating period consists of one grating 1903 and one adjacent grating gap.

Optionally, the imaging device further includes a fixing member, on which the two photoelectric sensors 1902 are mounted;

the grating ratio is a preset value, and the phase difference between the positions of the two photoelectric sensors 1902 on the fixing member with respect to the grating period conforms to a preset phase difference;

wherein, the grating ratio is a ratio of the width of one grating to the width of one grating period, and one grating period consists of one grating and one adjacent grating gap; the phase difference is calculated based on the grating period angle and a sensor angle, the grating period angle is an angle of one grating period on the inner sidewall of the focusing wheel, and the sensor angle is an angle between two photoelectric sensors on the inner sidewall of the focusing wheel.

Optionally, if the grating ratio d is d=0.5, the preset phase difference ω is: $0<\omega<360°$ and $\omega \neq 180°$;

if the grating ratio d is $0<d<0.5$, the preset phase difference ω is: $0<\omega<d*360°$ or $(1-d)*360°<\omega<360°$;

if the grating ratio d is $0.5<d<1$, the preset phase difference ω is: $0<\omega<(1-d)*360°$ or $d*360°<\omega<360°$.

Optionally, the parameter table contains a correspondence among five consecutive level signals of the first electrical signal, five consecutive level signals of the second electrical signal corresponding to the first electrical signal, and the rotation direction of the focusing wheel.

Optionally, the parameter table contains a correspondence among a first level status sequence of low-level, high-level, high-level, low-level and low-level of the first electrical signal, a second level status sequence of low-level, low-level, high-level, high-level and low-level of the second electrical signal, and a clockwise rotation direction;

a correspondence among a third level status sequence of low-level, low-level, high-level, high-level, and low-level of the first electrical signal, a fourth level status sequence of low-level, high-level, high-level, low-level, and low-level of the second electrical signal, and a counterclockwise rotation direction;

wherein, the phase of the first photoelectric sensor with respect to the grating period is smaller than the phase of the second photoelectric sensor with respect to the grating period.

Optionally, the processor 1904 may be specifically configured to:

if a first position and a second position are the same, determine that the current rotation direction of the focusing wheel is clockwise; the first position is the position of two adjacent level statuses of the first electrical signal in the first level status sequence, the second position is the position of two adjacent level statuses of the second electrical signal in the second level status sequence;

if a third position and a fourth position are the same, determine that the current rotation direction of the focusing wheel is counterclockwise; the third position is the position of two adjacent level statuses of the first electrical signal in the third level status sequence, the fourth position is the position of two adjacent level statuses of the second electrical signal in the fourth level status sequence.

The above processor may be a general-purpose processor, including a central processing unit (CPU), a network processor (NP), or the like; it may also be a digital signal processor (DSP), an Application Specific Integrated Circuit (ASIC), a Field-Programmable Gate Array (FPGA) or other programmable logic devices, discrete gate or transistor logic devices, discrete hardware components.

It can be seen that the imaging device provided by an embodiment of the present application can perform focusing by means of photoelectric sensors. The device for focusing by means of photoelectric sensors has a simple structure with a small number of parts, and reduced processing difficulty, which not only reduces the cost of the device, but also meets the needs of mass production.

In this specification, the embodiment of the imaging device is basically similar to the embodiment of the lens focusing method, so the description is relatively simple. For the related parts, reference can be made to the description of the embodiment of the lens focusing method as shown in FIGS. 2-8.

It should be noted that, in the present application, relationship terms such as "first," "second" and the like are only used to distinguish one entity or operation from another entity or operation, and do not necessarily require or imply that there is any such actual relationship or order between those entities or operations. Moreover, the terms "include," "contain" or any other variants are intended to cover a non-exclusive inclusion, such that processes, methods, objects or devices comprising a series of elements include not only those elements, but also other elements not specified or the elements inherent to those processes, methods, objects, or devices. Without further limitations, an element limited by the phrase "comprise(s) a . . . " do not exclude that there are other identical elements in the processes, methods, objects, or devices that comprise that element.

Each embodiment in this specification is described in a related manner, and the same or similar parts between the various embodiments can be referred to each other. Each embodiment focuses on the differences from other embodiments. In particular, for embodiments of an imaging device, since they are basically similar to the embodiments of the lens focusing method, the description thereof is relatively simple, and the relevant part may refer to the description of the embodiments of the lens focusing method.

The above descriptions are merely preferred embodiments of the present application, and are not intended to limit the protection scope of the present application. Any modification, equivalent replacement, and improvement made within the spirit and principle of this application fall within the protection scope of this application.

The invention claimed is:

1. An imaging device, wherein the imaging device comprises a focusing wheel, two photoelectric sensors, at least three gratings, a processor, a motor, and a lens, wherein gratings of the at least three gratings are distributed on an inner sidewall of the focusing wheel, grating gaps having a same width exist between adjacent gratings; when the focusing wheel rotates, a grating of the at least three gratings passes the two photoelectric sensors;

the processor is configured to determine a first electrical signal generated by a first photoelectric sensor of the two photoelectric sensors, wherein a level of the first electrical signal changes when a grating of the at least three gratings passes the first photoelectric sensor;

the processor is configured to determine a second electrical signal generated by a second photoelectric sensor of the two photoelectric sensors, wherein a level of the second electrical signal changes when a grating of the at least three gratings passes the second photoelectric sensor;

the processor is configured to determine a current rotation direction of the focusing wheel based on the first electrical signal and the second electrical signal as well as a preset parameter table, wherein the parameter table contains a correspondence among the first electrical signal, the second electrical signal, and a rotation direction of the focusing wheel;

the processor is configured to determine a current rotation angle of the focusing wheel based on the number of level jumps of the first electrical signal or the number of level jumps of the second electrical signal, wherein the level jump is a jump from high level to low level or a jump from low level to high level;

the processor is configured to drive the motor to focus the lens according to the current rotation direction and the current rotation angle of the focusing wheel;

wherein, the imaging device further comprises a fixing member, on which the two photoelectric sensors are mounted;

a grating ratio is a preset value, and a current phase difference between positions of the two photoelectric sensors on the fixing member with respect to the grating period conforms to a preset phase difference;

wherein, the grating ratio is a ratio of a width of one grating to a width of one grating period, and one grating period consists of one grating and one adjacent grating gap; the current phase difference is calculated based on the grating period angle and a sensor angle, the grating period angle is an angle of one grating period on the inner sidewall of the focusing wheel, and the sensor angle is an angle between the two photoelectric sensors on the inner sidewall of the focusing wheel;

wherein, if the grating ratio d is d=0.5, the preset phase difference ω is: 0<ω<360° and ω≠180°, if the grating ratio d is 0<d<0.5, the preset phase difference ω is: 0<ω<d*360° or (1−d)*360°<ω<360°, if the grating ratio d is 0.5<d<1, the preset phase difference ω is: 0<ω<(1−d)*360° or d*360°<ω<360°.

2. The imaging device according to claim 1, wherein, the processor is specifically configured to:

determine a current focusing direction of the lens based on a first parameter configuration and the current rotation direction of the focusing wheel, wherein the first parameter configuration contains a correspondence between a rotation direction of the focusing wheel and a focusing direction of the lens, the focusing direction of the lens comprises axial zoom in and axial zoom out;

determine a current focusing distance of the lens based on a second parameter configuration and the current rotation angle of the focusing wheel, wherein the second parameter configuration contains a correspondence between the rotation direction of the focusing wheel and the focusing direction of the lens;

drive the motor to focus the lens based on the current focusing direction and the current focusing distance of the lens.

3. The imaging device according to claim 1, wherein, the current rotation angle of the focusing wheel is equal to the number of level jumps multiplied by one grating period angle, wherein the grating period angle is an angle of one grating period on the inner sidewall of the focusing wheel, and one grating period consists of one grating and one adjacent grating gap.

4. The imaging device according to claim 1, wherein, the parameter table contains a correspondence among five consecutive level signals of the first electrical signal, five consecutive level signals of the second electrical signal corresponding to the first electrical signal, and the rotation direction of the focusing wheel.

5. The imaging device according to claim 4, wherein, the parameter table contains:

a correspondence among a first level status sequence of low-level, high-level, high-level, low-level and low-level of the first electrical signal, a second level status sequence of low-level, low-level, high-level, high-level and low-level of the second electrical signal, and a clockwise rotation direction;

a correspondence among a third level status sequence of low-level, low-level, high-level, high-level and low-level of the first electrical signal, a fourth level status sequence of low-level, high-level, high-level, low-level and low-level of the second electrical signal, and a counterclockwise rotation direction;

wherein a phase of the first photoelectric sensor with respect to a grating period is smaller than a phase of the second photoelectric sensor with respect to the grating period.

6. The imaging device according to claim 5, wherein, the processor is specifically configured to:

if a first position and a second position are the same, determine that the current rotation direction of the focusing wheel is clockwise; wherein, the first position is a position of two adjacent level statuses of the first electrical signal in the first level status sequence, the second position is a position of two adjacent level statuses of the second electrical signal in the second level status sequence;

if a third position and a fourth position are the same, determine that the current rotation direction of the focusing wheel is counterclockwise; the third position is a position of two adjacent level statuses of the first electrical signal in the third level status sequence, the fourth position is a position of two adjacent level statuses of the second electrical signal in the fourth level status sequence.

7. A lens focusing method, which is applied to an imaging device, wherein the imaging device comprises a focusing wheel, two photoelectric sensors, at least three gratings, a processor, a motor, and a lens, wherein gratings of the at least three gratings are distributed on an inner sidewall of the focusing wheel, grating gaps having a same width exist between adjacent gratings, when the focusing wheel rotates, a grating of the at least three gratings passes the two photoelectric sensors; the method comprises:

the processor determining a first electrical signal generated by a first photoelectric sensor of the two photoelectric sensors, wherein a level of the first electrical signal changes when a grating of the at least three gratings passes the first photoelectric sensor;

determining a second electrical signal generated by a second photoelectric sensor of the two photoelectric sensors, wherein a level of the second electrical signal changes when a grating of the at least three gratings passes the second photoelectric sensor;

determining a current rotation direction of the focusing wheel based on the first electrical signal and the second electrical signal as well as a preset parameter table, wherein the parameter table contains a correspondence among the first electrical signal, the second electrical signal, and a rotation direction of the focusing wheel;

determining a current rotation angle of the focusing wheel based on the number of level jumps of the first electrical signal or the number of level jumps of the second electrical signal, wherein the level jump is a jump from high level to low level or a jump from low level to high level;

driving the motor to focus the lens according to the current rotation direction and the current rotation angle of the focusing wheel wherein, the imaging device further comprises a fixing member, on which the two photoelectric sensors are mounted;

a grating ratio is a preset value, and a current phase difference between positions of the two photoelectric sensors on the fixing member with respect to the grating period conforms to a preset phase difference;

wherein, the grating ratio is a ratio of a width of one grating to a width of one grating period, and one grating period consists of one grating and one adjacent grating gap; the current phase difference is calculated based on the grating period angle and a sensor angle, the grating period angle is an angle of one grating period on the inner sidewall of the focusing wheel, and the sensor angle is an angle between the two photoelectric sensors on the inner sidewall of the focusing wheel;

wherein, if the grating ratio d is d=0.5, the preset phase difference $\omega$ is: $0<\omega<360°$ and $\omega \neq 180°$, if the grating ratio d is $0<d<0.5$, the preset phase difference $\omega$ is: $0<\omega<d*360°$ or $(1-d)*360°<\omega<360°$, if the grating ratio d is $0.5<d<1$, the preset phase difference $\omega$ is: $0<\omega<(1-d)*360°$ or $d*360°<\omega<360°$.

8. An imaging device, wherein the imaging device comprises a focusing wheel, two photoelectric sensors, a fixing member, a processor, a motor, a main lens barrel, a focusing lens barrel, and a first lens;

the focusing lens barrel is disposed within the main lens barrel to be axially movable;

the first lens is disposed fixedly within the main lens barrel;

at least two gratings are disposed on an inner sidewall of the focusing wheel, and grating gaps between two adjacent gratings are equal; a grating of the at least two gratings passes the two photoelectric sensors when the focusing wheel rotates;

the fixing member is fixed on an outer sidewall of the main lens barrel close to the motor;

the two photoelectric sensors are mounted on the fixing member, the focusing wheel is rotatably mounted on an outer sidewall of the main lens barrel away from the motor, a first gap exists between the focusing wheel and the fixing member along an axial direction of the main lens barrel;

the motor is mounted on an outer sidewall of the main lens barrel;

the photoelectric sensors are configured to generate electrical signals and send the generated electrical signals to the processor; wherein, the electrical signals generated by the photoelectric sensors change when a grating passes the photoelectric sensors;

the processor is electrically connected to the motor, and the processor is configured to drive the motor to move the focusing lens barrel according to the electrical signals sent by the photoelectric sensors.

9. The imaging device according to claim 8, wherein the imaging device further comprises a second lens and a pin;

the second lens is disposed fixedly within the focusing lens barrel;

the motor is connected to the focusing lens barrel via the pin;

the motor is used to drive the focusing lens barrel by means of the pin to move axially so as to adjust a relative position between the second lens and the first lens.

10. The imaging device according to claim 8, wherein, positions of the two photoelectric sensors on the fixing member form a preset angle;

a distance between the positions of the two photoelectric sensors on the fixing member is greater than or equal to one grating period, and one grating period consists of one grating and one adjacent grating gap;

the gratings are distributed over an entire circumference of the inner sidewall of the focusing wheel; or, the gratings are distributed over a part of a circumference of the inner sidewall of the focusing wheel.

11. The imaging device according to claim 8, wherein, the fixing member is sleeved fixedly on the outer sidewall of the main lens barrel close to the motor;

the focusing wheel is sleeved rotatably on the outer sidewall of the main lens barrel away from the motor;

a second gap exists between the focusing wheel and the outer sidewall of the main lens barrel.

12. The imaging device according to claim 8, wherein, the imaging device further comprises a focusing pressure ring;

the focusing pressure ring is connected to the fixing member;

the focusing pressure ring is sleeved on the outer sidewall of the main lens barrel;

the focusing wheel is sleeved on the outer sidewall of the focusing pressure ring.

13. The imaging device according to claim 8, wherein, the imaging device further comprises a PCB board, which is fixedly mounted on the fixing member and on which the two photoelectric sensors are mounted.

\* \* \* \* \*